(12) United States Patent
Stephens et al.

(10) Patent No.: US 6,877,980 B2
(45) Date of Patent: *Apr. 12, 2005

(54) BURNER WITH LOW $NO_x$ EMISSIONS

(75) Inventors: George Stephens, Humble, TX (US);
David B. Spicer, Houston, TX (US);
Robert Trimble, Sand Springs, OK (US); Gautam Gauba, Marlborough, MA (US); Mark E. Bury, Acton, MA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/388,833

(22) Filed: Mar. 14, 2003

(65) Prior Publication Data

US 2004/0018461 A1 Jan. 29, 2004

Related U.S. Application Data

(60) Provisional application No. 60/365,151, filed on Mar. 16, 2002, provisional application No. 60/365,235, filed on Mar. 16, 2002, provisional application No. 60/365,218, filed on Mar. 16, 2002, provisional application No. 60/365,227, filed on Mar. 16, 2002, provisional application No. 60/365,234, filed on Mar. 16, 2002, provisional application No. 60/365,224, filed on Mar. 16, 2002, provisional application No. 60/365,223, filed on Mar. 16, 2002, provisional application No. 60/365,150, filed on Mar. 16, 2002, provisional application No. 60/365,081, filed on Mar. 16, 2002, provisional application No. 60/365,139, filed on Mar. 16, 2002, and provisional application No. 60/365,145, filed on Mar. 16, 2002.

(51) Int. Cl.[7] ................................................. F23M 3/00
(52) U.S. Cl. ............................ 431/115; 431/9; 431/5; 126/91 A
(58) Field of Search ............................... 431/115, 5, 9, 431/215; 126/91 A

(56) References Cited

U.S. PATENT DOCUMENTS

| | | |
|---|---|---|
| 2,368,370 A | 1/1945 | Maxon |
| 2,813,578 A | 11/1957 | Ferguson |
| 2,918,117 A | 12/1959 | Griffin |

(Continued)

FOREIGN PATENT DOCUMENTS

| | | |
|---|---|---|
| CA | 1169753 | 6/1984 |
| DE | 2944153 | 5/1981 |
| DE | 3232421 | 3/1984 |

(Continued)

OTHER PUBLICATIONS

Straitz III, John F., et al., "Combat $NO_x$ With Better Burner Design," *Chemical Engineering*, Nov. 1994, pp. EE–4–EE–8.

Vahdati, M. M., et al., "Design And Development of A Low $NO_x$ Coanda Ejector Burner," *Journal of the Institute of Energy*, Mar. 2000, vol. 73, pp. 12–17.

Bussman, Wes, et al., "Low $NO_x$ Burner Technology for Ethylene Cracking Furnaces," presented at the *2001 AIChE Spring National Meeting, 13th Annual Ethylene Producers Conference*, Houston, TX, Apr. 25, 2001, pp. 1–23.

(Continued)

*Primary Examiner*—Alfred Basichas
(74) *Attorney, Agent, or Firm*—Lucinda Lomas; Linda A. Kubena

(57) ABSTRACT

A burner for use in furnaces such as in steam cracking. The burner includes a primary air chamber; a burner tube having an upstream end, a downstream end and a venturi intermediate said upstream and downstream ends, said venturi including a throat portion having substantially constant internal cross-sectional dimensions such that the ratio of the length to maximum internal cross-sectional dimension of said throat portion is at least 3; a burner tip mounted on the downstream end of said burner tube adjacent a first opening in the furnace, so that combustion of the fuel takes place downstream of said burner tip; and a fuel orifice located adjacent the upstream end of said burner tube, for introducing fuel into said burner tube.

34 Claims, 12 Drawing Sheets

U.S. PATENT DOCUMENTS

| | | | |
|---|---|---|---|
| 2,983,312 A | | 5/1961 | Finley et al. |
| 3,880,570 A | | 4/1975 | Marshall |
| 4,004,875 A | | 1/1977 | Zink et al. |
| 4,089,629 A | | 5/1978 | Baumgartner et al. |
| 4,130,388 A | | 12/1978 | Flanagan |
| 4,230,445 A | | 10/1980 | Janssen |
| 4,257,763 A | | 3/1981 | Reed |
| 4,575,332 A | | 3/1986 | Oppenberg et al. |
| 4,629,413 A | | 12/1986 | Michelson et al. |
| 4,708,638 A | | 11/1987 | Brazier et al. |
| 4,739,713 A | | 4/1988 | Vier et al. |
| 4,748,919 A | | 6/1988 | Campobenedetto et al. |
| 4,815,966 A | | 3/1989 | Janssen |
| 4,828,483 A | | 5/1989 | Finke |
| 4,963,089 A | | 10/1990 | Spielman |
| 4,995,807 A | | 2/1991 | Rampley et al. |
| 5,044,931 A | | 9/1991 | Van Eerden et al. |
| 5,073,105 A | | 12/1991 | Martin et al. |
| 5,092,761 A | | 3/1992 | Dinocolantonio |
| 5,098,282 A | | 3/1992 | Schwartz et al. |
| 5,135,387 A | | 8/1992 | Martin et al. |
| 5,152,463 A | | 10/1992 | Mao et al. |
| 5,154,596 A | | 10/1992 | Schwartz et al. |
| 5,195,884 A | | 3/1993 | Schwartz et al. |
| 5,201,650 A | | 4/1993 | Johnson |
| 5,224,851 A | | 7/1993 | Johnson |
| 5,238,395 A | | 8/1993 | Schwartz et al. |
| 5,254,325 A | * | 10/1993 | Yamasaki et al. ............ 423/450 |
| 5,263,849 A | | 11/1993 | Irwin et al. |
| 5,269,679 A | | 12/1993 | Syska et al. |
| 5,275,554 A | | 1/1994 | Faulkner |
| 5,284,438 A | | 2/1994 | McGill et al. |
| 5,299,930 A | | 4/1994 | Weidman |
| 5,316,469 A | | 5/1994 | Martin et al. |
| 5,326,254 A | | 7/1994 | Munk |
| 5,344,307 A | | 9/1994 | Schwartz et al. |
| 5,350,293 A | | 9/1994 | Khinkis et al. |
| 5,370,526 A | | 12/1994 | Buschulte et al. |
| 5,407,345 A | | 4/1995 | Robertson et al. |
| 5,413,477 A | | 5/1995 | Moreland |
| 5,470,224 A | | 11/1995 | Bortz |
| 5,472,341 A | | 12/1995 | Meeks |
| 5,542,839 A | | 8/1996 | Kelly |
| 5,562,438 A | | 10/1996 | Gordon et al. |
| 5,584,684 A | | 12/1996 | Dobbeling et al. |
| 5,603,906 A | | 2/1997 | Lang et al. |
| 5,611,682 A | | 3/1997 | Slavejkov et al. |
| 5,624,253 A | | 4/1997 | Sulzhik et al. |
| 5,685,707 A | * | 11/1997 | Ramsdell et al. ............. 431/90 |
| 5,688,115 A | * | 11/1997 | Johnson ........................ 431/9 |
| 5,807,094 A | | 9/1998 | Sarv |
| 5,813,846 A | * | 9/1998 | Newby et al. ................. 431/9 |
| 5,980,243 A | | 11/1999 | Surbey et al. |
| 5,984,665 A | | 11/1999 | Loftus et al. |
| 5,987,875 A | | 11/1999 | Hillburn et al. |
| 5,993,193 A | | 11/1999 | Loftus et al. |
| 6,007,325 A | | 12/1999 | Loftus et al. |
| 6,056,538 A | | 5/2000 | Büchner et al. |
| 6,332,408 B2 | * | 12/2001 | Howlett et al. ............. 110/189 |
| 6,347,935 B1 | | 2/2002 | Schindler et al. |
| 6,383,462 B1 | * | 5/2002 | Lang ........................ 423/235 |
| 6,616,442 B2 | | 9/2003 | Venizelos et al. |

FOREIGN PATENT DOCUMENTS

| | | |
|---|---|---|
| DE | 3818265 | 11/1989 |
| EP | 0099828 | 6/1988 |
| EP | 0 347 956 | 12/1989 |
| EP | 0 374 423 | 6/1990 |
| EP | 0 408 171 A1 | 1/1991 |
| EP | 0 507 233 | 10/1992 |
| EP | 0 620 402 A1 | 10/1994 |
| EP | 0 674 135 B2 | 9/1995 |
| EP | 0 751 343 | 1/1997 |
| EP | 0486169 | 1/1998 |
| EP | 1096202 | 2/2001 |
| EP | 1 211 458 | 6/2002 |
| FR | 2629900 | 10/1988 |
| SU | 374488 | 5/1970 |

OTHER PUBLICATIONS

Seebold, James G., "Reduce Heater $NO_x$ in the Burner," *Hydrocarbon Processing*, Nov. 1982, pp. 183–186.

"West Germany's Caloric Develops a Low–$NO_x$ Recycling Fuel Burner," *Chemical Engineering*, Oct. 4, 1982, p. 17.

Chemical Engineering Progress, vol. 43, 1947, "The Design of Jet Pumps" by A. Edgar Kroll, pp. 21–24, vol. 1, No. 2.

Abstract of EP 0 507 233 published on Oct. 7, 1992, entitled "Burner for Liquid Fuels".

* cited by examiner

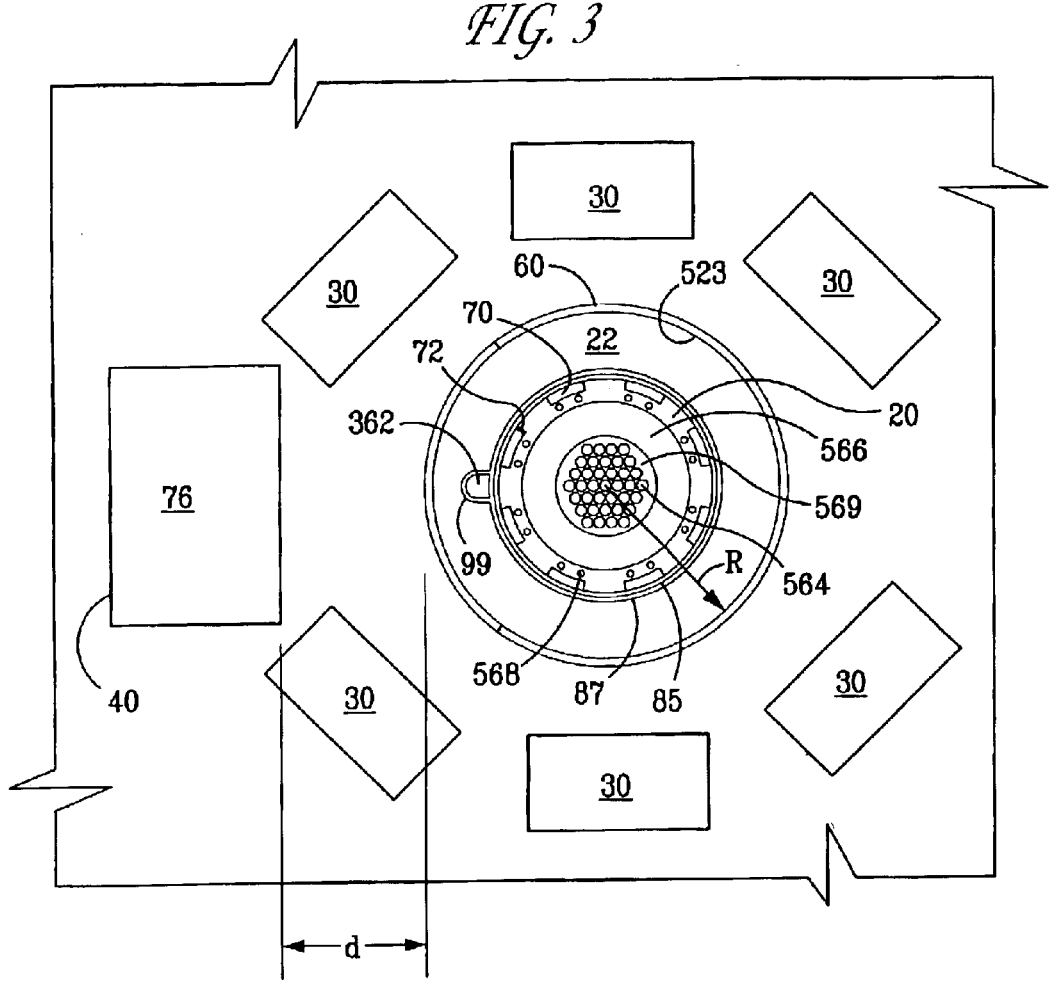
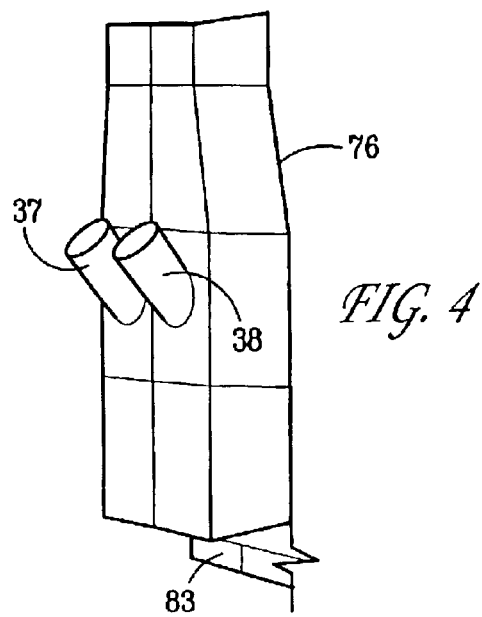

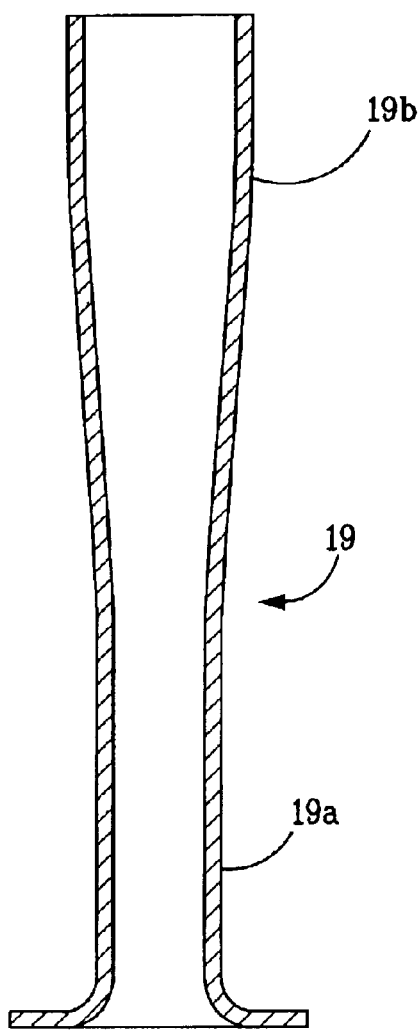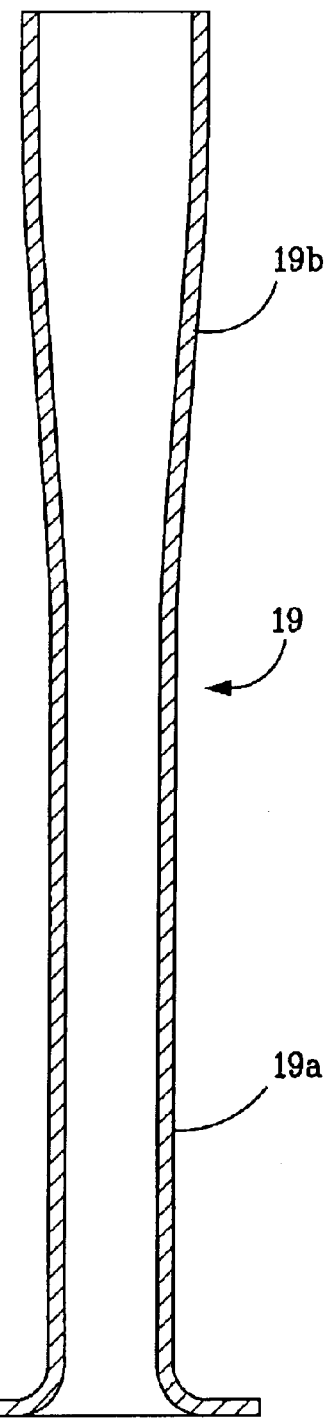

BURNER WITH LOW NO$_x$ EMISSIONS

RELATED APPLICATIONS

This patent application claims priority to Provisional Application Ser. Nos. 60/365,151, 60/365,235, 60/365,218, 60/365,227, 60/365,234, 60/365,224, 60/365,223, 60/365,150, 60/365,081, 60/365,139, and 60/365,145 all filed on Mar. 16, 2002 and all of which are incorporated by reference. Additionally, this patent application is related to the following patent applications filed with the following attorney docket numbers: 2002B017 ("Centering Plate For Pre-Mix Burner"), 2002B018 ("Burner Spud For Pre-Mix Burners"), 2002B022 ("Pre-Mix Burner With High Capacity Venturi"), 2002B025 ("Pre-Mix Burner With High Flow Area Tip"), 2002B026 ("Burner Employing Improved Flue-Gas Recirculation System With Enlarged Circulation Duct"), 2002B016 ("Pre-Mix Burner Design For Reduced Oxides of Nitrogen Emissions"), 2002B019 ("Burner Tip For Pre-Mix Burners"), 2002B020 ("Burner Employing Improved Flue-Gas Recirculation System"), 2002B021 ("Removable Light-Off Port Plug For Pre-Mix Burners"), 2002B027 ("Burner Design For Achieving Higher Rates of Flue Gas Recirculation") and 2002B030 ("Burner With Flue Gas Recirculation"), each of which is based upon the aforesaid Provisional Applications, respectively.

FIELD OF THE INVENTION

This invention relates to an improvement in a burner such as those employed in high temperature furnaces in the steam cracking of hydrocarbons. More particularly, it relates to an improved burner capable of increased flue gas recirculation, reduction in localized sources of NO$_x$ production, lower FGR duct temperatures and a resulting reduction in NO$_x$ emissions without an accompanying reduction in burner stability.

BACKGROUND OF THE INVENTION

Because of the interest in recent years to reduce the emission of pollutants from burners used in large furnaces and boilers, significant improvements have been made in burner design. In the past, improvements in burner design were aimed primarily at improving heat distribution. However, increasingly stringent environmental regulations have shifted the focus of burner design to the minimization of regulated pollutants.

Oxides of nitrogen (NO$_x$) are formed in air at high temperatures. These compounds include, but are not limited to nitrogen oxide and nitrogen dioxide. Reduction of NO$_x$ emissions is a desired goal to decrease air pollution and meet government regulations. In recent years, a wide variety of mobile and stationary sources of NO$_x$ emissions have come under increased scrutiny and regulation.

The rate at which NO$_x$ is formed is dependent upon the following variables: (1) flame temperature, (2) residence time of the combustion gases in the high temperature zone and (3) excess oxygen supply. The rate of formation of NO$_x$ increases as flame temperature increases. However, the reaction takes time and a mixture of nitrogen and oxygen at a given temperature for a very short time may produce less NO$_x$ than the same mixture at a lower temperature, over a longer period of time.

One strategy for achieving lower NO$_x$ emission levels is to install a NO$_x$ reduction catalyst to treat the furnace exhaust stream. This strategy, known as Selective Catalytic Reduction (SCR), is very costly and, although it can be effective in meeting more stringent regulations, represents a less desirable alternative to improvements in burner design.

Burners used in large industrial furnaces may use either liquid or gaseous fuel. Liquid fuel burners mix the fuel with steam prior to combustion to atomize the fuel to enable more complete combustion, and mix combustion air with the fuel at the zone of combustion.

Gas fired burners can be classified as either premix or raw gas, depending on the method used to combine the air and fuel. They also differ in configuration and the type of burner tip used.

Raw gas burners inject fuel directly into the air stream, such that the mixing of fuel and air occurs simultaneously with combustion. Since airflow does not change appreciably with fuel flow, the air register settings of natural draft burners must be changed after firing rate changes. Therefore, frequent adjustment may be necessary, as explained in detail in U.S. Pat. No. 4,257,763, which patent is incorporated herein by reference. In addition, many raw gas burners produce luminous flames.

Premix burners mix the fuel with some or all of the combustion air prior to combustion. Since premixing is accomplished by using the energy present in the fuel stream, airflow is largely proportional to fuel flow. As a result, therefore, less frequent adjustment is required. Premixing the fuel and air also facilitates the achievement of the desired flame characteristics. Due to these properties, premix burners are often compatible with various steam cracking furnace configurations.

Floor-fired premix burners are used in many steam crackers and steam reformers primarily because of their ability to produce a relatively uniform heat distribution profile in the tall radiant sections of these furnaces. Flames are non-luminous, permitting tube metal temperatures to be readily monitored. Therefore, a premix burner is the burner of choice for such furnaces. Premix burners can also be designed for special heat distribution profiles or flame shapes required in other types of furnaces.

In gas fired industrial furnaces, NO$_x$ is formed by the oxidation of nitrogen drawn into the burner with the combustion air stream. The formation of NO$_x$ is widely believed to occur primarily in regions of the flame where there exist both high temperatures and an abundance of oxygen. Since ethylene furnaces are amongst the highest temperature furnaces used in the hydrocarbon processing industry, the natural tendency of burners in these furnaces is to produce high levels of NO$_x$ emissions.

The majority of recent low NO$_x$ burners for gas-fired industrial furnaces are based on the use of multiple fuel jets in a single burner. Such burners may employ fuel staging, flue-gas recirculation, or a combination of both. U.S. Pat. Nos. 5,098,282 and 6,007,325 disclose burners using a combination of fuel staging and flue-gas recirculation. Certain burners may have as many as 8–12 fuel nozzles in a single burner. The large number of fuel nozzles requires the use of very small diameter nozzles. In addition, the fuel nozzles of such burners are generally exposed to the high temperature flue-gas in the firebox.

In the high temperature environment of steam-cracking furnaces used for the manufacture of ethylene, the combination of small diameter fuel nozzles and exposure to high temperature flue gas can lead to fouling and potential plugging of the fuel jets. This not only has an adverse impact on burner performance, but also increases the cost of maintenance associated with repeated cleaning of fuel nozzles.

However, one advantage of the staged-air pre-mix burners disclosed in U.S. Pat. Nos. 4,629,413 and 5,092,761 (and discussed below) relates to their use of a single fuel nozzle. This permits the size of the fuel nozzle to be the maximum possible for a given burner firing duty. In addition, since the fuel nozzle is located at the inlet to the venturi, it is not exposed directly to either the high temperature flue-gas or the radiant heat of the firebox. For these reasons the problems of fuel nozzle fouling are minimized, providing a significant advantage for the staged-air pre-mix burner in ethylene furnace service.

One technique for reducing $NO_x$ that has become widely accepted in industry is known as staging. With staging, the primary flame zone is deficient in either air (fuel-rich) or fuel (fuel-lean). The balance of the air or fuel is injected into the burner in a secondary flame zone or elsewhere in the combustion chamber. As is well known, a fuel-rich or fuel-lean combustion zone is less conducive to $NO_x$ formation than an air-fuel fuel ratio closer to stoichiometry. Combustion staging results in reducing peak temperatures in the primary flame zone and has been found to alter combustion speed in a way that reduces $NO_x$. Since $NO_x$ formation is exponentially dependent on gas temperature, even small reductions in peak flame temperature dramatically reduce $NO_x$ emissions. However this must be balanced with the fact that radiant heat transfer decreases with reduced flame temperature, while CO emissions, an indication of incomplete combustion, may actually increase.

In the context of premix burners, the term primary air refers to the air premixed with the fuel; secondary, and in some cases tertiary, air refers to the balance of the air required for proper combustion. In raw gas burners, primary air is the air that is more closely associated with the fuel; secondary and tertiary air is more remotely associated with the fuel. The upper limit of flammability refers to the mixture containing the maximum fuel concentration (fuel-rich) through which a flame can propagate.

U.S. Pat. No. 4,629,413 discloses a low $NO_x$ premix burner and discusses the advantages of premix burners and methods to reduce $NO_x$ emissions. The premix burner of U.S. Pat. No. 4,629,413 lowers $NO_x$ emissions by delaying the mixing of secondary air with the flame and allowing some cooled flue gas to recirculate with the secondary air. The manner in which the burner disclosed achieves light off at start-up and its impact on $NO_x$ emissions is not addressed. The contents of U.S. Pat. No. 4,629,413 are incorporated by reference in their entirety.

U.S. Pat. No. 2,813,578, the contents of which are incorporated by reference in their entirety, discloses a heavy liquid fuel burner, which mixes the fuel with steam for inspiration prior to combustion. The inspirating effect of the fuel and steam draws hot furnace gases into a duct and into the burner block to aid in heating the burner block and the fuel and steam passing through a bore in the block. This arrangement is disclosed as being effective to vaporize liquid fuel and reduce coke deposits on the burner block and also to prevent any dripping of the oil.

U.S. Pat. No. 2,918,117 discloses a heavy liquid fuel burner, which includes a venturi to draw products of combustion into the primary air to heat the incoming air stream to therefore completely vaporize the fuel.

U.S. Pat. No. 4,004,875, the contents of which are incorporated by reference in their entirety, discloses a low $NO_x$ burner, in which combusted fuel and air is cooled and recirculated back into the combustion zone. The recirculated combusted fuel and air is formed in a zone with a deficiency of air.

U.S. Pat. No. 4,230,445, the contents of which are incorporated by reference in their entirety, discloses a fluid fuel burner that reduces $NO_x$ emissions by supplying a flue gas/air mixture through several passages. Flue gas is drawn from the combustion chamber through the use of a blower.

U.S. Pat. No. 4,575,332, the contents of which are incorporated by reference in their entirety, discloses a burner having both oil and gas burner lances, in which $NO_x$ emissions are reduced by discontinuously mixing combustion air into the oil or gas flame to decelerate combustion and lower the temperature of the flame.

U.S. Pat. No. 5,263,849 discloses a burner system for a furnace combustion chamber having an ignition chamber for discharging an ignited combustible mixture of primary air and fuel into the furnace combustion chamber, and a plurality of nozzle ports for directing a high velocity stream of secondary air into the furnace combustion chamber. The system includes a fuel supply and separately controlled primary and secondary air supply lines. U.S. Pat. No. 5,263,849 discloses the use of an igniter that projects angularly into a flame holder. The contents of U.S. Pat. No. 5,263,849 are incorporated by reference in their entirety.

U.S. Pat. No. 4,708,638, the contents of which are incorporated by reference in their entirety, discloses a fluid fuel burner in which $NO_x$ emissions are reduced by lowering the flame temperature. A venturi in a combustion air supply passage, upstream of a swirler, induces the flow of flue gas into the combustion air supply passage from ducts opening into the furnace. A swirler is located at the free end of a fuel pipe and mixes the flue gas with the primary combustion air.

U.S. Pat. No. 5,269,679 discloses a gas-fired burner incorporating an air driven jet pump for mixing air, fuel and recirculated flue gas. The burner is configured for the staged introduction of combustion air to provide a fuel-rich combustion zone and a fuel-lean combustion zone. A pilot flame is provided through a tube that ignites the air and fuel mixture in a diffuser. Combustion can be observed through a scanner tube. The burner is said to achieve reduced $NO_x$ emission levels in high temperature applications that use preheated combustion air. The contents of U.S. Pat. No. 5,269,679 are incorporated by reference in their entirety.

U.S. Pat. No. 5,092,761 discloses a method and apparatus for reducing $NO_x$ emissions from premix burners by recirculating flue gas. Flue gas is drawn from the furnace through recycle ducts by the inspirating effect of fuel gas and combustion air passing through a venturi portion of a burner tube. Airflow into the primary air chamber is controlled by dampers and, if the dampers are partially closed, the reduction in pressure in the chamber allows flue gas to be drawn from the furnace through the recycle ducts and into the primary air chamber. The flue gas then mixes with combustion air in the primary air chamber prior to combustion to dilute the concentration of oxygen in the combustion air, which lowers flame temperature and thereby reduces $NO_x$ emissions. The flue gas recirculating system may be retrofitted into existing burners or may be incorporated in new low $NO_x$ burners. The entire contents of U.S. Pat. No. 5,092,761 are incorporated herein by reference.

Thus, one set of techniques achieves lower flame temperatures by using staged-air or staged-fuel burners to lower flame temperatures by carrying out the initial combustion at far from stoichiometric conditions (either fuel-rich or air-rich) and adding the remaining air or fuel only after the flame has radiated some heat away to the fluid being heated in the furnace.

Another set of techniques achieves lower flame temperatures by diluting the fuel-air mixture with diluent material. Flue-gas (the products of the combustion reaction) or steam is commonly used as a diluent. Such burners are classified as FGR (flue-gas-recirculation) or steam-injected, respectively.

A drawback of the system of U.S. Pat. No. 5,092,761 is that the staged-air used to cool the FGR duct must first enter the furnace firebox, traverse a short distance across the floor and then enter the FGR duct. During this passage, the staged air is exposed to radiation from the hot flue-gas in the firebox. Analyses of experimental data from burner tests suggest that the staged-air may be as hot as 700° F. when it enters the FGR duct.

From the standpoint of $NO_x$ production, another drawback associated with the burner of U.S. Pat. No. 5,092,761 relates to the configuration of the lighting chamber, necessary for achieving burner light off. The design of this lighting chamber, while effective for achieving light off, has been found to be a localized source of high $NO_x$ production during operation. Other burner designs possess a similar potential for localized high $NO_x$ production, since similar configurations are known to exist for other burner designs, some of which have been described hereinabove.

Analysis of burners of the type described in U.S. Pat. No. 5,092,761 has indicated the flue-gas-recirculation (FGR) ratio is generally in the range 5–10% where FGR ratio is defined as:

FGR ratio (%)=100[G/(F+A)]

where
G=Flue-gas drawn into venturi, (lb)
F=Fuel combusted in burner, (lb), and
A=Air drawn into burner, (lb).

The ability of these burners to generate higher FGR ratios is limited by the inspirating capacity of the fuel orifice/gas spud/venturi combination. Further closing or partially closing the primary air dampers will produce lower pressures in the primary air chamber and thus enable increased FGR ratios. However, when the ratio of FGR is increased, the flame becomes more susceptible to entrainment into the FGR duct, which raises combustion temperature, which, in turn raises $NO_x$ and may cause damage to metal parts.

As disclosed in "The Design of Jet Pumps" by A. E. Knoll, appearing in Vol. 43 of Chemical Engineering Progress, published by the American Institute of Chemical Engineers (1947), it is known to optimize the operation of venturis used in air and steam operated air movers at relatively mild (roughly ambient) temperatures. In contrast, in the burner of the invention, combustible gaseous fuel (including, but not limited to, methane, $H_2$, ethane and propane) is used to move a combination of very hot (above 1000° F.) flue gases, hot air, hot uncombusted fuel (CO), and ambient air.

Additionally, commercial experience and modeling have shown when flue gas recirculation rates are raised, there is a tendency of the flame to be drawn into the FGR duct. Often, it is this phenomenon that constrains the amount of flue gas recirculation. When the flame enters directly into the flue gas recirculation duct, the temperature of the burner venturi tends to rise, which raises flame speed and causes the recirculated flue gas to be less effective in reducing $NO_x$. From an operability perspective, the flue gas recirculation rate needs to be lowered to keep the flame out of the FGR duct to preserve the life of the metallic FGR duct.

Moreover, internal flow dynamics in the area of the fuel riser/burner spud assembly/venturi combination can affect the inspirating capacity of the combination, reducing the ability to achieve FGR ratios in excess of 10%. In this regard, the fuel riser/burner spud centering plate assembly used in some burners to assure that the fuel riser/burner spud assembly is aligned with the venturi, can serve to negatively affect internal flow dynamics in the area of the fuel riser/burner spud assembly/venturi combination, reducing inspirating capacity.

An additional challenge to the designer of low $NO_x$ burners is to maintain adequate flame stability. The very techniques used to minimize $NO_x$ emissions reduce flame temperature and flame speed, and generally lead to less stable flames, which are more prone to "lift-off." "Lift-off" is a term used to describe a flame where the point of combustion has left the burner tip. In extreme cases, lift-off can lead to instances of flameout; where combustion at the burner is extinguished. Such a condition is highly undesirable as it can potentially lead to an accumulation of an air/fuel mixture in the firebox.

From the standpoint of $NO_x$ production, a drawback has been discovered which is associated with the burner tip of the burner of U.S. Pat. No. 5,092,761. One drawback relates to the inability to precisely distribute air flow adjacent to the burner tip, which can result in localized sources of high $NO_x$ production.

Therefore, what is needed is a burner for the combustion of fuel that enables higher flue gas recirculation ratios (FGR) to be utilized while minimizing or eliminating any accompanying reduction in burner stability, yielding reductions in $NO_x$ emissions. It is also desirable that the improved burner have the characteristic that localized sources of $NO_x$ production are substantially reduced and that lower FGR duct temperatures are achieved, yielding further reductions in $NO_x$ emissions.

SUMMARY OF THE INVENTION

The present invention is directed to a burner capable of achieving lower levels of $NO_x$ emissions for use in furnaces such as those employed in steam cracking. The burner includes:

(a) a primary air chamber;
(b) a burner tube having an upstream end, a downstream end and a venturi intermediate said upstream and downstream ends, said venturi including a throat portion having substantially constant internal cross-sectional dimensions such that the ratio of the length to maximum internal cross-sectional dimension of said throat portion is at least 3;
(c) a burner tip mounted on the downstream end of said burner tube adjacent a first opening in the furnace, so that combustion of the fuel takes place downstream of said burner tip; and
(d) a fuel orifice located adjacent the upstream end of said burner tube, for introducing fuel into said burner tube.

An object of the present invention is to provide a burner arrangement that permits higher flue gas recirculation rates to be employed, thus reducing $NO_x$ emissions.

Another object of the present invention is to provide an improved burner with lower FGR duct temperatures.

Another object of the present invention is to provide an improved burner wherein localized sources of $NO_x$ production are substantially reduced.

Yet another object of the present invention is to provide the above features and objects without an accompanying decrease in burner stability.

These and other objects and features of the present invention will be apparent from the detailed description taken with reference to accompanying drawings.

BRIEF DESCRIPTION OF THE DRAWINGS

The invention is further explained in the description that follows with reference to the drawings illustrating, by way of non-limiting examples, various embodiments of the invention wherein:

FIG. 3 is a plan view taken along line 3—3 of FIG. 1;

FIG. 4 is a perspective view of an embodiment of a flue gas recirculation duct in accordance with the present invention;

FIG. 7A and FIG. 7B are sectional views comparing, respectively the venturi of a conventional burner tube with the venturi of a burner tube of a burner in accordance with the present invention;

DETAILED DESCRIPTION OF PREFERRED EMBODIMENTS

Figure 1:
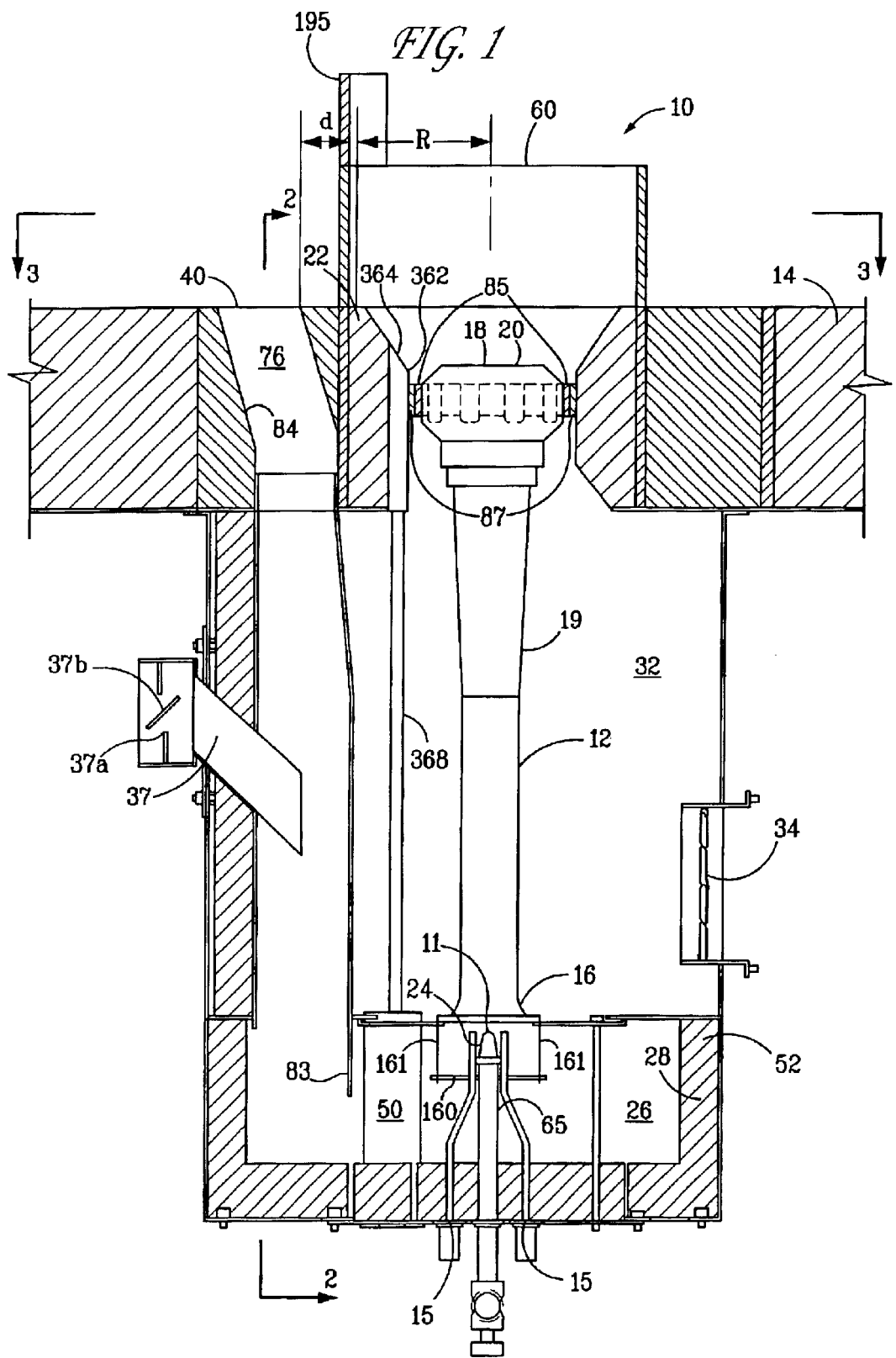
FIG. 1 illustrates an elevation partly in section of the burner of the present invention.

Although the present invention is described in terms of a burner for use in connection with a furnace or an industrial furnace, it will be apparent to one of skill in the art that the teachings of the present invention also have applicability to other process components such as, for example, boilers. Thus, the term furnace herein shall be understood to mean furnaces, boilers and other applicable process components.

Referring to FIGS. 1–4, a burner 10 includes a freestanding burner tube 12 located in a well in a furnace floor 14. The burner tube 12 includes an upstream end 16, a downstream end 18 and a venturi portion 19. A burner tip 20 is located at the downstream end 18 and is surrounded by an annular tile 22. A fuel orifice 11, which may be located within fuel spud 24, is located at the top end of a gas fuel riser 65 and is located at the upstream end 16 of tube 12 and introduces fuel into the burner tube 12. Fresh or ambient air is introduced into a primary air chamber 26 through an adjustable damper 37b to mix with the fuel at the upstream end 16 of the burner tube 12 and pass upwardly through the venturi portion 19. Combustion of the fuel and fresh air occurs downstream of the burner tip 20.

A plurality of air ports 30 (FIGS. 2 and 3) originate in a secondary air chamber 32 and pass through the furnace floor 14 into the furnace. Fresh or ambient air enters the secondary air chamber 32 through adjustable dampers 34 and passes through the staged air ports 30 into the furnace to provide secondary or staged combustion.

In order to recirculate flue gas from the furnace to the primary air chamber, FGR duct 76 extends from opening 40, in the floor of the furnace into the primary air chamber 26. Alternatively, multiple passageways (not shown) may be used instead of a single passageway. Flue gas is drawn through FGR duct 76 by the inspirating effect of fuel passing through venturi 19 of burner tube 12. In this manner, the primary air and flue gas are mixed in primary air chamber 26, which is prior to the zone of combustion. Therefore, the amount of inert material mixed with the fuel is raised, thereby reducing the flame temperature, and as a result, reducing $NO_x$ emissions. Closing or partially closing damper 37b restricts the amount of fresh air that can be drawn into the primary air chamber 26 and thereby provides the vacuum necessary to draw flue gas from the furnace floor.

Mixing is promoted by providing two or more primary air channels 37 and 38 protruding into the FGR duct 76. The channels 37 and 38 are conic-section, cylindrical, or squared and a gap between each channel 37 and 38 produces a turbulence zone in the FGR duct 76 where good flue gas/air mixing occurs.

The geometry of channels 37 and 38 is designed to promote mixing by increasing air momentum into the FGR duct 76. The velocity of the air is optimized by reducing the total flow area of the primary air channels 37 and 38 to a level that still permits sufficient primary air to be available for combustion, as those skilled in the art are capable of determining through routine trials.

Mixing is further enhanced by a plate member 83 at the lower end of the inner wall of the FGR duct 76. The plate member 83 extends into the primary air chamber 26. Flow eddies are created by flow around the plate of the mixture of flue gas and air. The flow eddies provide further mixing of the flue gas and air. The plate member 83 also makes the FGR duct 76 effectively longer, and a longer FGR duct also promotes better mixing.

The improvement in the amount of mixing between the recirculated flue gas and the primary air caused by the channels 37 and 38 and the plate member 83 results in a higher capacity of the burner to inspirate flue gas recirculation and a more homogeneous mixture inside the venturi portion 19. Higher flue gas recirculation reduces overall flame temperature by providing a heat sink for the energy released from combustion. Better mixing in the venturi portion 19 tends to reduce the hot-spots that occur as a result of localized high oxygen regions.

Unmixed low temperature ambient air (primary air), is introduced through angled channels 37 and 38, each having a first end comprising an orifice 37a and 38a, controlled by damper 37b, and a second end comprising an orifice which communicates with FGR duct 76. The ambient air so introduced is mixed directly with the recirculated flue gas in FGR duct 76. The primary air is drawn through channels 37 and 38, by the inspirating effect of the fuel passing through the fuel orifice, which may be contained within gas spud 24. The ambient air may be fresh air as discussed above.

Additional unmixed low temperature ambient air, having entered secondary air chamber 32 through dampers 34 is drawn through orifice 62, through bleed air duct 64, through orifice 97 into FGR duct 76 and into the primary air chamber 26 by the inspiring effect of the fuel passing through venturi portion 19. The ambient air may be fresh air as discussed above. The mixing of the cool ambient air with the flue gas lowers the temperature of the hot flue gas flowing through FGR duct 76 and thereby substantially increases the life of FGR duct 76 and allows use of this type of burner to reduce $NO_x$ emission in high temperature cracking furnaces having flue gas temperature above 1900° F. in the radiant section of the furnace. Bleed air duct 64 has a first end 66 and a second end 68, first end 66 connected to orifice 62 of secondary air chamber 32 and second end 68 connected to orifice 97 of FGR duct 76.

Additionally, a minor amount of unmixed low temperature ambient air, relative to that amount passing through bleed air duct 64, having passed through air ports 30 into the furnace, may also be drawn through FGR duct 76 into primary air chamber 26 by the inspirating effect of the fuel passing through venturi portion 19. To the extent that damper 37b is completely closed, bleed air duct 64 should be sized so as to permit the necessary flow of the full requirement of primary air needed by burner 10.

As may be appreciated, a feature of the burner of the present invention is that the flue-gas recirculated to the burner is mixed with a portion of the cool staged air in the FGR duct 76. This mixing reduces the temperature of the stream flowing in the FGR duct 76, and enables readily available materials to be used for the construction of the burner. This feature is particularly important for the burners of high temperature furnaces such as steam crackers or reformers, where the temperature of the flue-gas being recirculated can be as high as 1900° F.–2100° F. By combining approximately one pound of staged-air with each pound of flue-gas recirculated, the temperature within the FGR duct can be advantageously reduced.

Unlike prior designs, one or more passageways connecting the secondary air chamber directly to the flue-gas recirculation duct induce a small quantity of low temperature secondary air into the FGR duct 76 to cool the air/flue-gas stream entering in the metallic section of the FGR duct 76. By having the majority of the secondary air supplied directly from the secondary air chamber, rather than having the bulk of the secondary air traverse across the furnace floor prior to entering the FGR duct, beneficial results are obtained, as demonstrated by the Examples below.

Advantageously, a mixture of from about 20% to about 80% flue gas and from about 20% to about 80% ambient air should be drawn through FGR duct 76. It is particularly preferred that a mixture of about 50% flue gas and about 50% ambient air be employed. The desired proportions of flue gas and ambient air may be achieved by proper sizing, placement and/or design of FGR duct 76, bleed air ducts 64 and air ports 30, as those skilled in the art will readily recognize. That is, the geometry and location of the air ports and bleed air ducts may be varied to obtain the desired percentages of flue gas and ambient air.

A sight and lighting port 50 is provided in the primary chamber 26, both to allow inspection of the interior of the burner assembly, and to provide access for lighting of the burner 10 with lighting element (not shown). The burner plenum may be covered with mineral wool or ceramic fiber insulation 52 and wire mesh screening (not shown) to provide insulation therefor. The lighting chamber 99 is located at a distance from burner tip 20 effective for burner light off. A lighting torch or igniter (not shown) of the type disclosed in U.S. Pat. No. 5,092,761 has utility in the start-up of the burner. To operate the burner of the present invention, the torch or igniter is inserted through light-off port 50 into the lighting chamber 99, which is adjacent burner tip 20, to light the burner 10.

In operation, fuel orifice 11, which may be located within gas spud 24, discharges fuel into burner tube 12, where it mixes with primary air, recirculated flue gas or mixtures thereof. The mixture of fuel, recirculated flue-gas and primary air then discharges from burner tip 20. The mixture in the venturi portion 19 of burner tube 12 is maintained below the fuel-rich flammability limit; i.e. there is insufficient air in the venturi to support combustion. Secondary air is added to provide the remainder of the air required for combustion.

In addition to the use of flue gas as a diluent, another technique to achieve lower flame temperature through dilution is through the use of steam injection. Steam can be injected in the primary air or the secondary air chamber. Steam may be injected through one or more steam injection tubes 15, as shown in FIG. 1. Preferably, steam is injected upstream of the venturi.

The cross-section of FGR duct 76 is substantially rectangular, typically with its minor dimension ranging from 30% to 100% of its major dimension. Conveniently, the cross sectional area of FGR duct 76 ranges from about 5 square inches to about 12 square inches/million (MM) Btu/hr burner capacity and, in a practical embodiment, from 34 square inches to 60 square inches. In this way the FGR duct 76 can accommodate a mass flow rate of at least 100 pounds per hour per MM Btu/hr burner capacity, preferably at least 130 pounds per hour per MM Btu/hr burner capacity, and still more preferably at least 200 pounds per hour per MM Btu/hr burner capacity. Moreover, FGR ratios of greater than 10% and up to 15% or even up to 20% can be achieved.

With reference to FIGS. 1–3 and FIG. 12 and in one embodiment of the present invention, a wall 60 encircles the burner tip 20 mounted on the downstream end 18 of the burner tube 12 to provide a barrier between a base of a flame downstream of the burner tip 20 and both FGR duct 76 in the furnace and one or more air ports 30.

Figure 2:
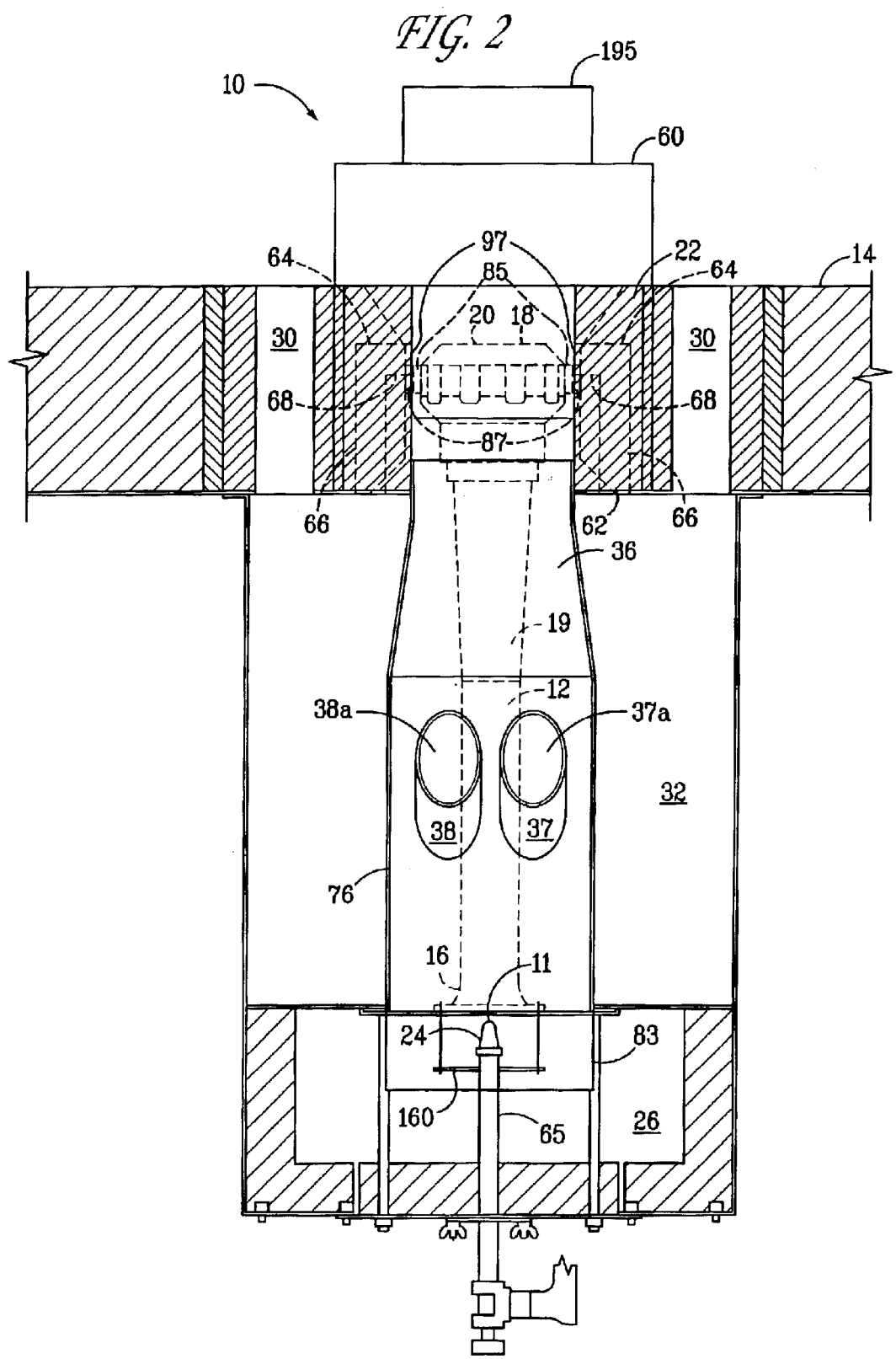
FIG. 2 is an elevation partly in section taken along line 2—2 of FIG. 1.
Figure 12:
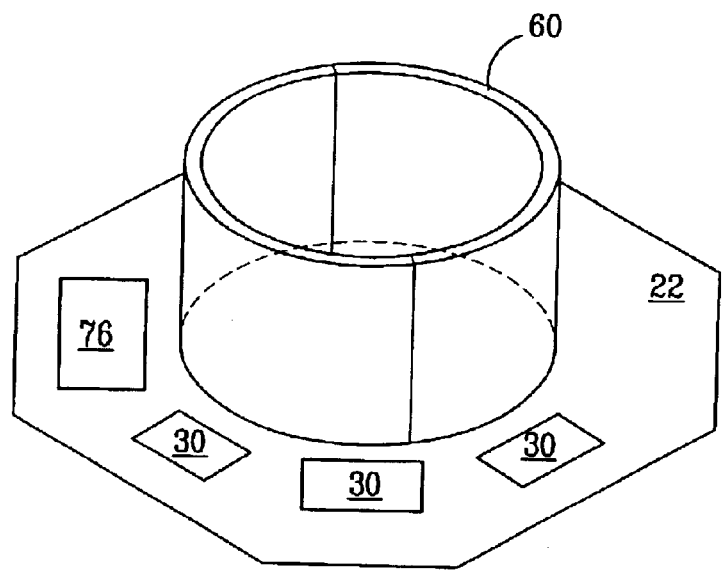
FIG. 12 is a perspective view of a separation wall in accordance with one embodiment of the present invention.
Figure 12A:
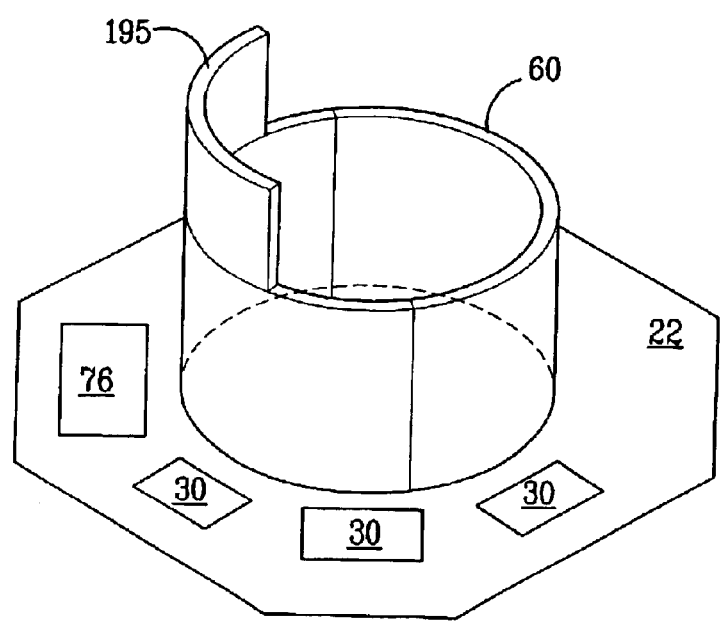
FIG. 12A is a perspective view of another separation wall in accordance with another embodiment of the present invention.

In accordance with a preferred embodiment of the present invention, as shown in FIGS. 1, 2 and 12A, a partial wall 195 is provided in addition to wall 60, wall 60 encircling the burner tip 20, as previously described to provide a further barrier between a base of a flame downstream of the burner tip 20 and FGR duct 76.

Figure 5:
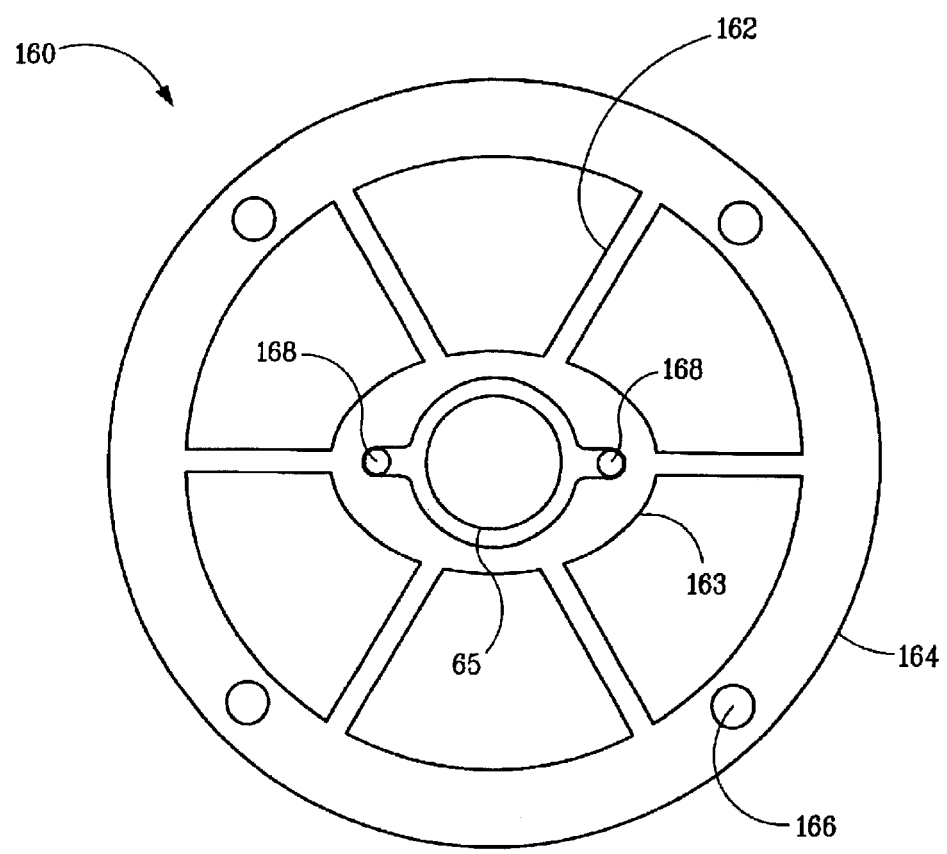
FIG. 5 is a top plan view of a centering plate used in an embodiment of the burner of the present invention.

The burner of the present invention may further include a novel centering plate as is now described with reference to FIGS. 1 and 5. Support members 161 suspend a perforated centering plate 160 from the roof of the primary air chamber 26. As shown in FIG. 5, a specific embodiment of the perforated centering plate 160 has a plurality of spokes 162 interconnecting a riser centering member 163 and a peripheral ring support member 164. The riser centering member 163 is positioned about the gas riser 65 for maintaining the fuel orifice/gas spud in proper alignment with the inlet to the venturi portion 19. The ring member 164 has a plurality of holes 166 for use in securing the centering plate 160 to the support members 161.

In one embodiment of the present invention, centering plate 160 also contains a pair of holes 168 to permit a corresponding pair of steam injection tubes 15 to pass through centering plate 160 to the extent such steam injection tubes 15 are present.

As noted above, the centering plate 160 is perforated to permit flow therethrough of air from the primary air chamber 26, which avoids flow losses that result from a normally tortuous flow pattern caused by a presently used solid centering plate. These flow losses are avoided because the perforated centering plate design smoothes out the flow vectors entering the venturi portion 19 of the burner tube to enable higher venturi capacity, higher flue gas recirculation rate, lower flame temperature and lower $NO_x$ production.

Although centering plate 160 as shown in FIG. 5 is illustrated as circular and although a circular shape is the preferred embodiment of the present invention, it will be understood by those of skill in the art that the centering plate may be formed into many other shapes, including, for example, oval, square, or triangular without departing from the scope or spirit of the present invention.

Figure 6A:
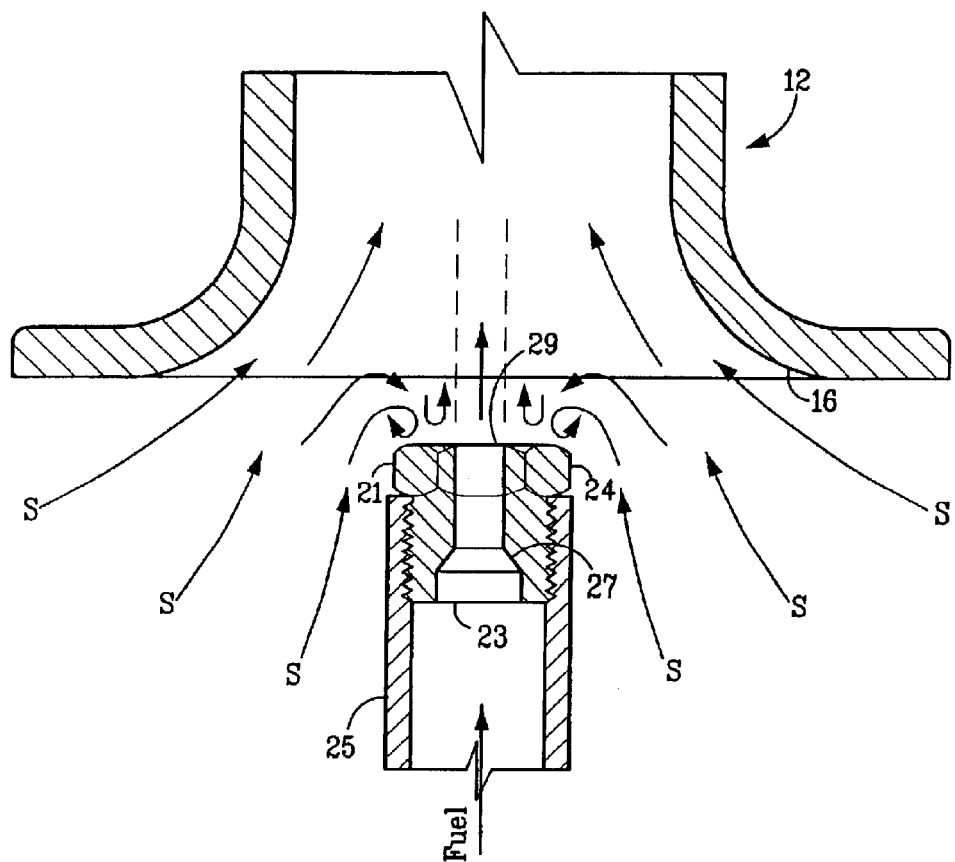
FIG. 6A is a cross-sectional view of a fuel spud.
Figure 6B:
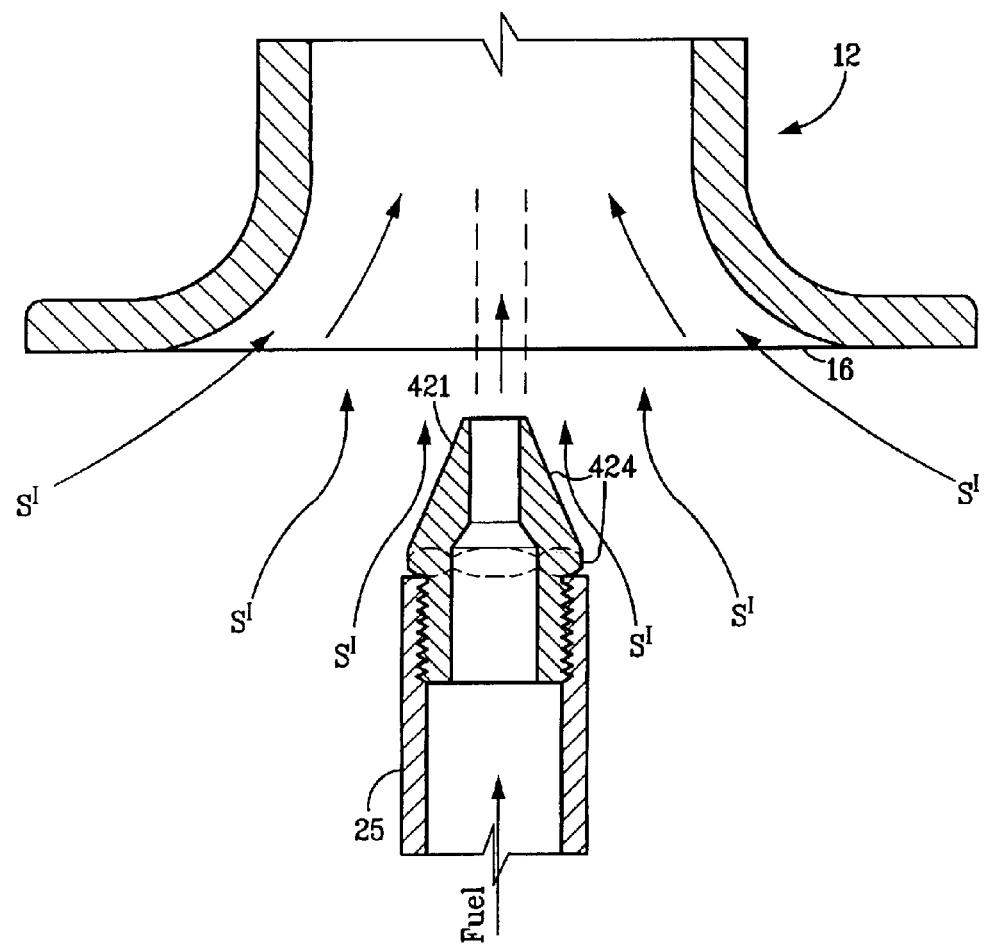
FIG. 6B is a cross-sectional view of another embodiment of an improved fuel spud in accordance with the present invention.

The burner of the present invention may employ a novel fuel spud as is now described with specific reference to FIG. 3, FIG. 6A and FIG. 6B. Referring now to FIG. 6A, a conventional fuel spud 24 is shown. Fuel spud 24 is affixed to the outlet end of fuel supply pipe 25, preferably by threads, as shown. Fuel spud 24 is aligned with the upstream end 16 of burner tube 12, so that fuel exiting the outlet end 29 of fuel spud 24 will flow into the upstream end 16 of burner tube 12, together with primary air and recirculated flue gas. As shown, the inner diameter of the inlet end 23 of fuel spud 24 transitions to a smaller diameter at outlet end 29 through the use of transition section 27. The outer surface 21 of fuel spud 24 is exposed to the venturi inlet flow stream, represented by streamlines S. Outer surface 21 is in the form of a hex-shaped nut, for ease in installation.

While outer surface 21 may be helpful in the installation of fuel spud 24, as is illustrated by streamlines S of FIG. 6A, when air is drawn into the venturi inlet 16, flow past the edges of fuel spud 24 generates a zone of eddies and turbulence immediately adjacent to the highest velocity portion of fuel spud 24. The energy dissipated in this zone of eddies reduces the inspirating efficiency of the fuel spud 24 and burner tube 12 venturi combination. This inefficiency limits the FGR ratio achievable in the burner.

FIG. 6B depicts a fuel spud 424, designed in accordance with another preferred form. As shown, fuel spud 424 employs a smoothly profiled outer surface 421, which takes the form of a frustum of a cone, to eliminate flow separation and eddies as the air and recycled flue gas pass over fuel spud 424 into upstream end 16 of burner tube 12. As schematically depicted by flow streamlines $S^i$, eddies and turbulence are minimized, thus improving the inspirating efficiency of the system. As a result of this improvement, higher FGR ratios and lower $NO_x$ emissions can be achieved.

Unlike prior designs, use of the fuel spud design of the present invention serves to improve the inspiration characteristics of the fuel spud/burner tube/venturi combination, increasing the ability to utilize higher levels of FGR and reduce $NO_x$ emissions.

Figure 8:
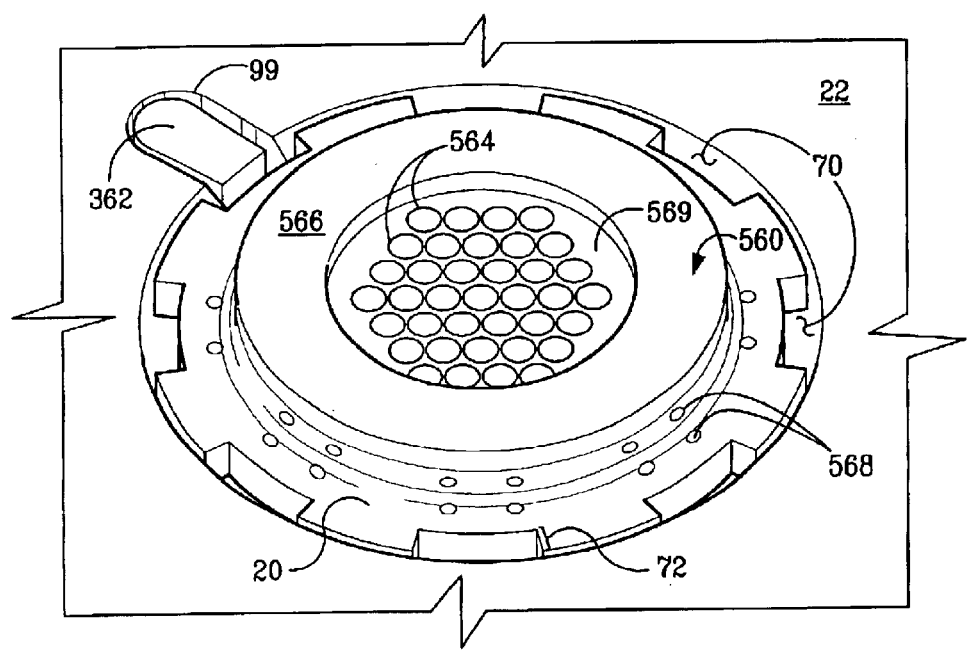
FIG. 8 is a perspective view of the burner tip of the present invention.

The present invention may include a novel burner tip 20 as is now discussed with specific reference to FIGS. 1, 2, 3 and 8. A very small gap exists between the burner tip 20 and the burner tile 22. By precisely engineering this gap, the bulk of the secondary staged air is forced to enter the furnace through staged air ports 30 located some distance from the primary combustion zone, which is located immediately on the furnace side of the burner tip 20. This gap may be a single peripheral gap, or alternatively, comprise a series of spaced gaps 70 peripherally arranged, as shown in FIG. 8.

In connection with the novel burner spud 24 and novel burner tip 20 of the present invention, the mixture of fuel, recirculated flue gas and primary air discharges from burner tip 20. The mixture in the venturi portion 19 of burner tube 12 is maintained below the fuel-rich flammability limit; i.e. there is insufficient air in the venturi to support combustion. Staged, secondary air is added to provide the remainder of the air required for combustion. The majority of the staged air is added a finite distance away from the burner tip 20 through staged air ports 30. However a portion of the staged, secondary air passes between the burner tip 20 and the annular tile 22 and is immediately available to the fuel exiting the side ports 568 of burner tip 20. As indicated, side-ports 568 direct a fraction of the fuel across the face of the annular tile 22, while main ports 564, direct the major portion of the fuel into the furnace.

As may be envisioned, two combustion zones are established. A small combustion zone is established across the face of the peripheral tile 22, emanating from the fuel combusted in the region of the side ports 568, while a much larger combustion zone is established projecting into the furnace firebox, emanating from the fuel combusted from the main ports 564. In operation, the larger combustion zone represents an approximately cylindrical face of combustion extending up from the burner, where the staged air flowing primarily from air ports 30 meets the fuel-rich mixture exiting from the burner tip main ports 564.

Analysis of burner performance has shown that the combustion zone adjacent to the side ports 568 and peripheral tile 22 is important in assuring flame stability. To provide adequate flame stability, the air/fuel mixture in this zone, which comprises the air/fuel mixture leaving the side ports 568 of burner tip 20, plus the air passing between the burner tip 20 and the peripheral tile 22, must be above the fuel-rich flammability limit.

While a mixture above the fuel-rich flammability limit in the combustion zone adjacent to the side ports 568 and peripheral tile 22 assures good burner stability, combustion in this zone has been found to generate relatively high $NO_x$ levels compared to the larger combustion zone. It has been discovered that overall $NO_x$ emissions may be reduced by minimizing the proportion of fuel that is combusted in this smaller combustion zone. More particularly, it has been found that in a staged-air, pre-mix burner employing integral flue-gas recirculation, when the quantity of fuel discharged into the combustion zone adjacent to side ports 568 and peripheral tile 22 does not exceed about 15% of the total fuel fired in the burner, lower overall $NO_x$ emissions are experienced. This is achieved by further assuring that the air flow between burner tip 20 and the peripheral tile 22 is such that combustion takes place within this zone with a mixture sufficiently above the fuel-rich flammability limit to assure good burner stability, but without the high oxygen concentrations that lead to high $NO_x$ emissions.

The novel burner tip design of the present invention limits the fuel discharged into the combustion zone adjacent to the side ports 568 and peripheral tile 22 to about eight percent of the total fuel. This design advantageously maintains the desired air/fuel ratio in this combustion zone, while maintaining a burner-tip-to-peripheral-tile gap of between about 0.15" to about 0.40". As shown, rather than have two rows of about thirty side ports, as is common in conventional designs, the burner tip 20 of the present invention has two rows of 16 side ports 568, each side port having a diameter of about 6 mm. Advantageously, with this design, $NO_x$ emissions are reduced without the problems normally associated with reduced flame temperature and flame speed. The result is a very stable flame that is not prone to "lift-off." Reducing the diameter of the side ports 568 to about 5 mm also helps limit the fuel discharged into the combustion zone adjacent to the side ports 568 and peripheral tile 22 to between about 5 and 15 percent of the total fuel fired, while still producing a very stable flame.

In one embodiment of the present invention, burner tip 20 has an upper end 566 which, when installed, faces the burner box and a lower end adapted for mating with the downstream end 18 of burner tube 12. Mating of the lower end of burner tip 20 to the burner tube 12 can be achieved by swaging or, more preferably, by welding or threaded engagement.

Figure 9A:
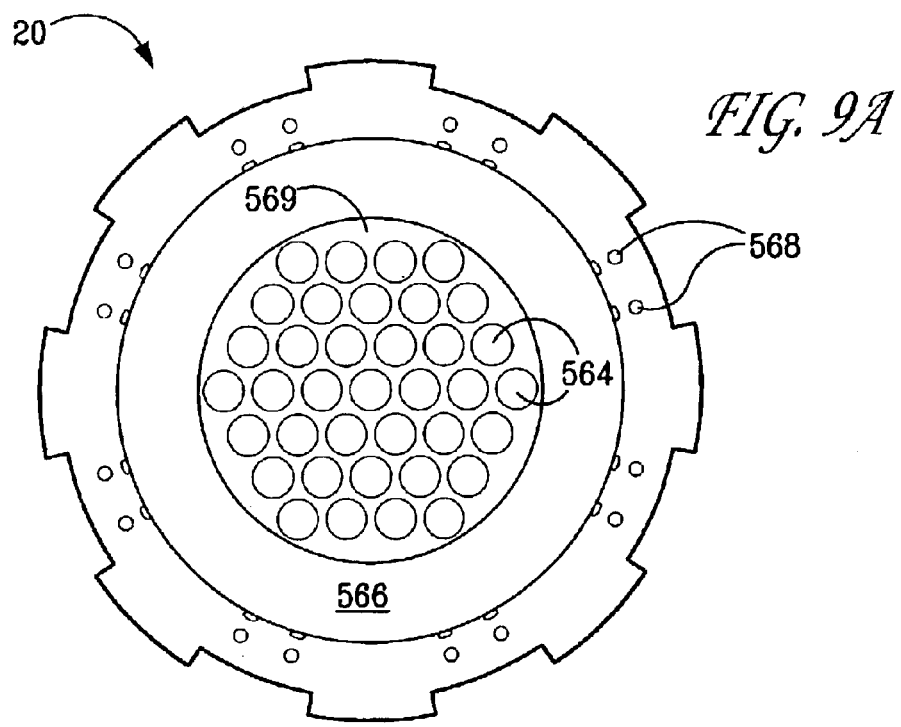
FIGS. 9A and 9B are plan views of the tip of the burner of the present invention and the tip of a conventional burner, respectively.

Referring specifically to FIGS. 3, 8, and 9A, the upper end 566 of the burner tip 20 includes a plurality of main ports 564 in a centrally disposed end surface 569 and a plurality of side ports 568 in a peripheral side surface. In operation, the side ports 568 direct a portion of the fuel/air mixture across the face of the tile 22, whereas the main ports 64 direct the major portion of the mixture into the furnace.

Figure 9B:
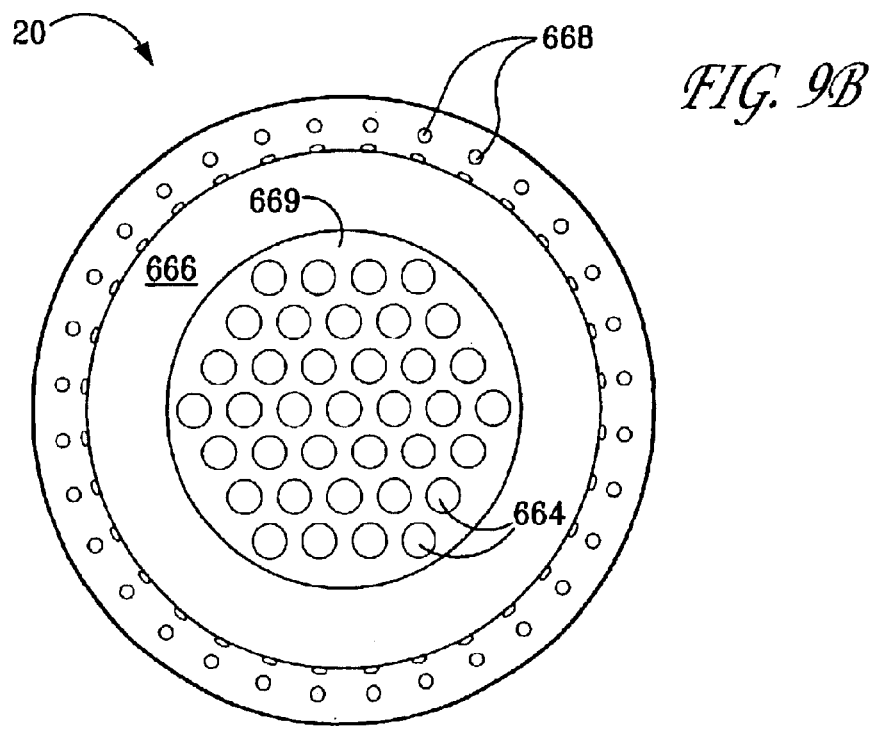
Figure 10A:
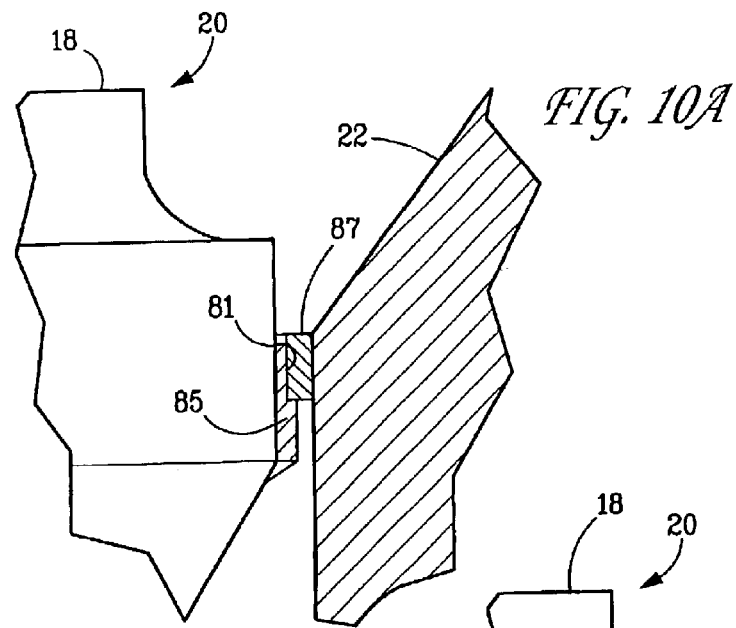
FIG. 10A is an exploded view of one embodiment of a burner tip seal of the present invention.
Figure 10B:
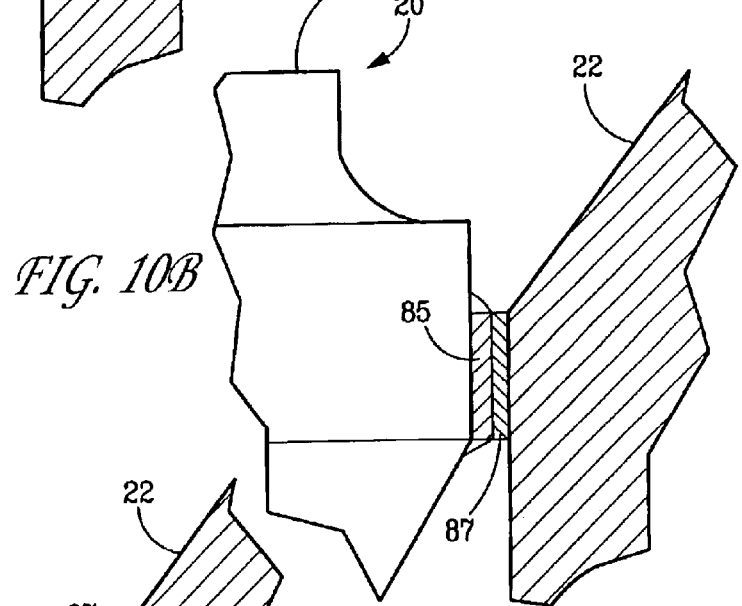
FIG. 10B is an exploded view of another embodiment of a burner tip seal of the present invention.
Figure 10C:
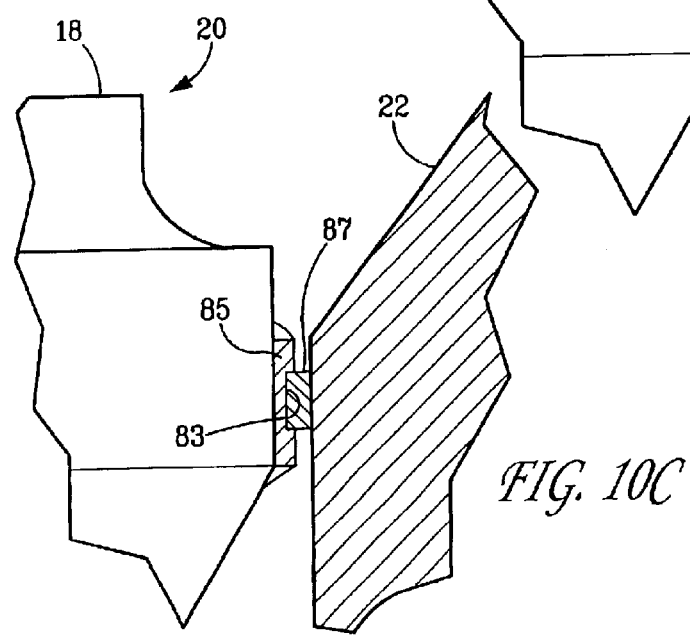
FIG. 10C is an exploded view of yet another embodiment of a burner tip seal of the present invention.

Referring now to FIGS. 9A and 9B, the upper end 566 of the burner tip 20 of FIG. 1 is shown in FIG. 9A, whereas FIG. 9B shows the upper end 666 of a conventional burner tip 20. Referring to FIG. 9A, it will be seen that the number and size of the main ports 564 in the centrally disposed end surface 569 of the burner tip 20 of the invention are significantly larger than those of the conventional tip. In particular, the number and dimensions of the main ports 564 in the tip of the invention are such that the total area of the main ports 564 in the end surface 569 is at least 1 square inch, preferably at least 1.2 square inch, per million (MM) Btu/hr burner capacity. In contrast, in the conventional burner tip shown in FIG. 9B, the total area of the main ports 664 in the end surface 669 is less than 1 square inch per MMBtu/hr burner capacity. Referring again to FIG. 9A, in one practical embodiment of a burner tip according to the invention, wherein the design firing rate of the burner is 6.0 MM Btu/hr, the total area of the main ports 564 in the end surface 569 is 8.4 $in^2$ whereas, in the conventional burner tip for use at the same design firing rate, the total area of these openings is only 5.8 $in^2$.

Intuitively, it would be expected that raising the tip flow area would proportionally reduce tip velocity, but instead, it is found that the drop in velocity can be mitigated by the fact that raising tip flow area raises FGR.

The increased total area of the main ports 564 in the burner tip 20 results in an increase in the flow area of the burner tip 20, which in turn enables higher FGR, rates to be induced without increasing the velocity for the fuel/air mixture flowing through the tip. In this way, stable operation of the burner can be retained with higher FGR rates.

As those skilled in the art recognize, the reduction in the number of side ports necessary to achieve the objects of the present invention is dependant upon a number of factors including the properties of the fuel, itself, the dynamics of fluid flow and the kinetics of combustion. While the burner tips of the present invention present designs having about a 53% reduction in the number of side ports, it would be expected that reductions in the number of side ports ranging from about 25% to about 75% could be effective as well, so long as each side port and the burner-tip-to-peripheral-tile gap is appropriately sized.

In the burner tip designs of the present invention, preferably the dimensions of the burner-tip-to-peripheral-tile gap are such that the total air available to the fuel gas exiting the side ports (i.e. the sum of air exiting the side ports with the fuel gas, plus the air supplied through gap), is between about 5 to about 15 percentage points above the Fuel Rich Flammability Limit for the fuel being used. For example, if the fuel being used has a Fuel Rich Flammability Limit of 55% of the air required for stoichiometric combustion, the air available to the fuel gas exiting the side ports should represent 60–65% of the air required for stoichiometric combustion.

Unlike prior designs, use of the burner tip of the present invention serves to substantially minimize localized sources of high $NO_x$ emissions in the region near the burner tip.

The burner 10 of the present invention may also comprise a novel venturi 19 as now discussed. Referring now to FIG. 7A, a venturi 19 of a conventional burner, of the type disclosed in U.S. Pat. No. 5,092,761, includes a relatively short throat portion 19a that is of substantially constant internal cross-sectional dimensions along its length and a divergent cone portion 19b, wherein the ratio of the length to maximum internal cross-sectional dimension of the throat portion 19a is less than 3, typically 2.6. As shown in FIG. 7B, a venturi of a burner tube of a burner in accordance with the present invention also includes a throat portion 19a of substantially constant internal cross-sectional dimensions and a divergent cone portion 19b. However, the throat portion 19a of the burner of the present invention is significantly longer than that of the conventional burner, as shown in FIG. 7A such that the ratio of the length to maximum internal cross-sectional dimension of the throat portion 19a is at least 3, preferably from about 4 to about 10, more preferably from about 4.5 to about 8, still more preferably from about 6.5 to about 7.5 and most preferably from about 6.5 to about 7.0. The internal surface of the throat portion 19a of the burner of the present invention is preferably cylindrical.

Increasing the ratio of length to internal cross-sectional dimensions in the throat portion of the venturi is found to reduce the degree of flow separation that occurs in the throat and cone portions of the venturi which increases the capacity of the venturi to entrain flue gas thereby allowing higher flue gas recirculation rates and hence reduced flame temperature and $NO_x$ production. A longer venturi throat also promotes better flow development and hence improved mixing of the fuel gas/air stream prior to the mixture exiting the burner tip 20. Better mixing of the fuel gas/air stream also contributes to $NO_x$ reduction by producing a more evenly developed flame and hence reducing peak temperature regions.

The burner 10 of the present invention may include a novel lighting chamber arrangement as will now be discussed with particular reference to FIGS. 1, 3 and 8. It has been discovered through testing that increasing the gap between the burner tip 20 and the burner tile 22 raises the overall $NO_x$ emissions produced by the burner, but also raises overall flame stability. The size of the gap should be sized such that it is small enough to minimize $NO_x$, and large enough to maintain adequate flame stability. In this regard, lighting chamber 99 may be seen to pose a problem. To substantially eliminate the effect on $NO_x$ emissions created by the presence of lighting chamber 99, which provides a significant cross-sectional flow area for additional air to pass, a removable lighting chamber plug 362 having a shape effective to substantially fill lighting chamber 99 when positioned within lighting chamber 99 is provided.

To operate the burner 10 of the present invention, a torch or igniter is inserted through light-off tube 50 into the lighting chamber 99, which is adjacent to the primary combustion area and burner tip 20, to light the burner. Following light-off, the lighting chamber 99 is plugged-off by inserting removable lighting chamber plug 362 through light-off tube 50 into the lighting chamber 99, for normal operation, eliminating the zone of high oxygen concentration adjacent to the primary combustion zone, and thus reducing the $NO_x$ emissions from the burner. For ease of installation, the lighting chamber plug 362 may be affixed to an installation rod, to form lighting chamber plug assembly 368, which is inserted through light-off tube 50 into lighting chamber 99. The construction of the removable lighting chamber plug assembly 368 allows convenient attachment to the burner plenum through conventional mechanical attachment of installation rod to burner plenum.

The removable lighting chamber plug 362 and assembly is advantageously constructed of materials adequate for the high temperature environment inside the furnace. The face 364 of the removable lighting chamber plug 362, which is the surface exposed to the furnace and which fits into burner tile 22, may be profiled to form an extension of the axisymetric geometry of the burner tile 22, thus creating a flush mounting with the burner tile 22, as shown in FIG. 1. The lighting chamber plug 362 should be constructed of a ceramic or high temperature refractory material suitable for temperatures in the range of from 2600 to 3600° F., as is typical for furnace burner tiles. One material having utility in the practice of the present invention is a ceramic fiber blanket, such as Kaowool® Ceramic Fiber Blanket, which may be obtained from Thermal Ceramics Corporation of Atlanta, Ga., in commercial quantities.

As may be appreciated, the burner plenum may be covered with mineral wool and wire mesh screening 52 to provide insulation therefor.

The burner 10 of the present invention may also include a novel tip seal arrangement as will now be discussed in connection with FIGS. 3, 8, 10A–10C, and 11. It has been discovered through testing that increasing the available flow area of the gap between the burner tip 20 and the peripheral burner tile 22 raises the overall $NO_x$ emissions produced by the burner, although it tends to also benefit flame stability. In view of its impact on $NO_x$ emissions, each gap between the burner tip 20 and the burner tile 22 must be correctly sized to maintain stability and minimize $NO_x$.

To optimize burner performance for low $NO_x$ emissions, the distance between the burner tip 20 and peripheral tile 22 must be held to a tight dimensional tolerance to ensure good air distribution around burner tip 20 and to minimize or significantly reduce unwanted air flow into the region. This unwanted air flow can cause the flames emanating from the side ports to be closer to stoichiometric conditions, tending to raise flame temperature and $NO_x$ levels.

As may be appreciated by those skilled in the art, the outer diameter of the burner tip 20 and the air flow notches 70 can be manufactured to relatively tight tolerances through investment casting or machining. However, the peripheral tile 22 is more difficult to manufacture to the same tolerances, creating an unwanted gap between the outer diameter of the burner tip 20 and the peripheral tile 22. Typically, a peripheral tile is poured into a mold using a castable refractory material. Compounding the problem of producing peripheral burner tiles to tight tolerances is the amount of shrinkage that the tiles experience when dried and fired. The amount of shrinkage varies according to material, temperature, and geometry, causing additional uncertainties in the final manufactured tolerances. These factors contribute to the difficulty in consistently manufacturing a tile to a specified diameter, which can lead to a tile that is too small in diameter or, more commonly, one that is too large in diameter.

While a potential solution is to manufacture the peripheral tile burner tip hole to a tighter tolerance, this requires that the peripheral tile's hole be machined, rather than cast. However, machining a hole in a conventional peripheral tile is difficult, time consuming and costly. Further, even if the tolerances are small during manufacturing, problems such as cracking of the ceramic material can occur due to differential thermal expansion between the metallic burner tip and the ceramic tile.

To establish a uniform dimension between the burner tip 20 and the peripheral burner tile 22 for the air gaps 70, a burner tip band 85, which may be formed of steel or other metal or metal composite capable of withstanding the harsh environment of an industrial burner, is attached to the outer periphery of burner tip 20, by tack welding or other suitable means. Advantageously, a compressible high temperature material 87 is optionally employed in the unwanted gap between the burner tip band 85 and the peripheral tile 22 to further reduce or eliminate the gap. Burner tip band 85 may further include a peripheral indentation 81 (see FIG. 10A) or peripheral indentation 83 (see FIG. 10C), respectively, for seating said compressible high temperature material. An advantage of this novel design is that the peripheral tile hole size can vary significantly, while the compressible material can adjusted for this variance in order to maintain the seal between the burner tip 20 and peripheral tile 22. By using the burner tip designs of the present invention, the air gap between the burner tip and peripheral tile can be maintained to exacting tolerances, essentially eliminating unwanted air leakage.

As may be appreciated, compressible material 87 should be rated for high temperature service since it is very close to the burner side port flames. A material that expands when heated is very useful as compressible material 87 because it makes the initial installation much easier. Examples of suitable materials include, but are not limited to, Triple T™ by Thermal Ceramics and Organically Bound Maftec™ (OBM Maftec™) distributed by Thermal Ceramics of Atlanta, Ga., a division of Morgan Crucible. It was found that OBM Maftec™ is preferable since it held together better after being exposed to high temperatures. OBM Maftec™ is produced from high quality mullite fiber. This material is known to possess low thermal conductivity and heat storage and is resistant to thermal shock and chemical attack. It additionally is highly flexible, has a maximum temperature rating of 2900° F. and a continuous use limit of up to 2700° F., making it ideal for this application. While the Triple T™ material expands more than the Maftec™, it was found to flake apart more easily after heating.

Figure 11:
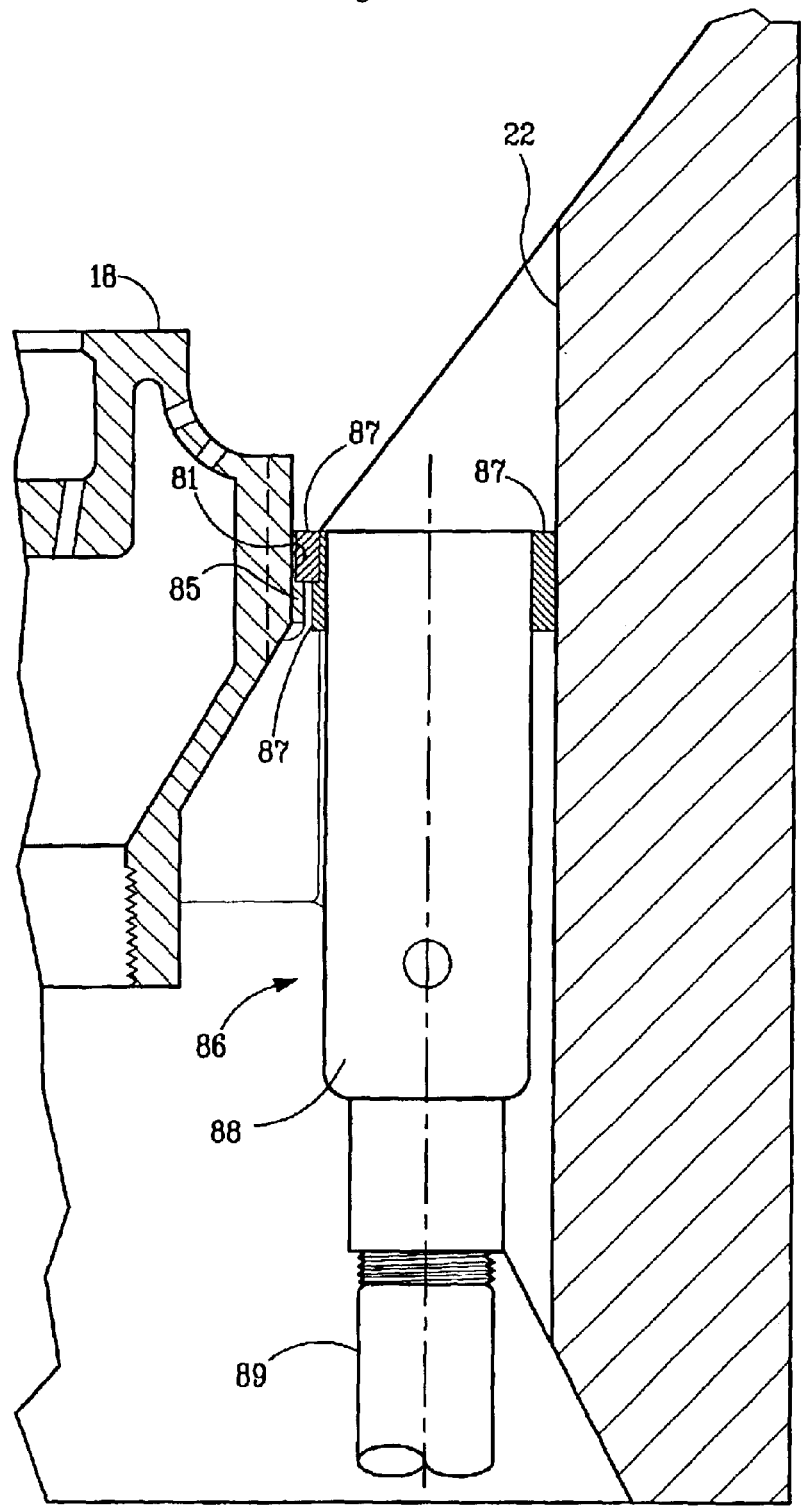
FIG. 11 illustrates an embodiment of a seal means for sealing in the region of the pilot chamber according to the present invention.

Referring now to FIG. 11, a similar benefit may be obtained in the region of pilot 86, adjacent to the first opening in the furnace. It has been observed that significant leakage occurs in typical designs due to gaps existing around the pilot shield 88. To remedy this, a compressible high temperature material 87 is installed around the pilot shield 88, and/or pilot riser 89 to eliminate the unwanted gap between the burner tip band 85 and the peripheral tile 22, as shown in FIG. 11. For example, it has been found that a one inch wide by 0.1875 inch thick strip of OBM Maftec™ works particularly well to seal gaps existing around the pilot shield 88.

The burner of the present invention may also comprise an angled FGR duct as next discussed in connection with FIGS. 1–3. As shown, an aspect of the present invention angles the FGR duct 76 outwardly at 84 such that the opening 40 of the duct 76 is physically further spaced away from the base of the burner tip 20. The angled FGR duct inlet 84 thus avoids or at least reduces the potential for the burner flame to be entrained into the FGR duct 76. This embodiment enables higher flue gas recirculation (FGR) rates to be induced into the burner 10. Such higher FGR rates, in turn, reduce overall flame temperature and $NO_x$ production.

With reference to FIG. 3, a flame opening 523 is circular and has a radius R, and the distance (d) that the duct opening 40 is laterally spaced from the flame opening 523 is defined by $d \geq 0.5$ R for avoiding entrainment of the flame into the duct opening 40.

Referring again to FIG. 1, the angle outward at 84 also permits the continued use of the relatively small burner box. It should be noted that such FGR burners may be in the order of 6 feet in height by 3 feet in width.

Referring to FIGS. 1, 2 and 12A, another aspect of the invention serves to further increase the effective distance between the opening 40 of the FGR duct 76 and the base of the burner flame. In this embodiment, a physical wall 195 is installed between the burner tip 20 and the opening 40 to the FGR duct 76. The wall 195 also avoids or at least reduces the potential for the burner flame to be entrained into the FGR duct 76, and therefore enables higher flue gas recirculation (FGR) rates to be induced into the burner 10. Such higher FGR rates, in turn, reduce overall flame temperature and $NO_x$ production. According to the teachings of the present invention, wall 195 may be, curved as shown in FIG. 12A or other shapes, as would be obvious to one of skill in the art.

EXAMPLES

The following examples illustrate the benefits resulting from the novel venturi of the present invention:

Example 1

To demonstrate the benefits of the present invention, a pair of pre-mix burners of the type described in U.S. Pat. No. 5,092,761 (as depicted in FIG. 5 of U.S. Pat. No. 5,092,761) were operated at a firing rate of 6 MMBTU/hr per burner, using a fuel gas comprised of 30% $H_2$/70% natural gas, without steam injection. During this test, $NO_x$ emissions were measured at 88 ppm.

Tests were repeated with steam injection. Steam was injected, per burner, at 133 lb/hr and 195 lb/hr, with $NO_x$ emission levels measured at 58 ppm and 49 ppm, respectively.

Example 2

In this example, a pair of pre-mix burners employing the features depicted in FIGS, 1–5, 6B, 7B, 9A, 10B, and 12A were tested. The burner employed flue gas recirculation and was operated at a firing rate of 6 MMBTU/hr per burner, using a fuel gas comprised of 30% $H_2$/70% natural gas, without steam injection. During this test, $NO_x$ emissions were measured at 42 ppm. Very stable flames were observed.

Tests were repeated with steam injection. Steam was injected, per burner, at 133 lb/hr, 195 lb/hr and 292 lb/hr, with $NO_x$ emission levels measured at 28.5 ppm, 23.5 ppm and 21 ppm, respectively. Once again, very stable flames were observed in each instance.

Although the burners of this invention have been described in connection with floor-fired hydrocarbon cracking furnaces, they may also be used in furnaces for carrying out other reactions or functions.

It will also be understood that the teachings described herein also have utility in traditional raw gas burners and raw gas burners having a pre-mix burner configuration wherein flue gas alone is mixed with fuel gas at the entrance to the burner tube. In fact, it has been found that the pre-mix, staged-air burners of the type described in detail herein can be operated with the primary air damper doors closed, with very satisfactory results.

Thus, it can be seen that, by use of this invention, $NO_x$ emissions may be reduced in a burner without the use of fans or otherwise special burners. The centering plate of the burner of the present invention can also easily be retrofitted to existing burners.

In addition to the use of flue gas as a diluent, another technique to achieve lower flame temperature through dilution is through the use of steam injection. Steam can be injected in the primary air or the secondary air chamber. Preferably, steam may be injected upstream of the venturi.

Although the invention has been described with reference to particular means, materials and embodiments, it is to be understood that the invention is not limited to the particulars disclosed and extends to all equivalents within the scope of the claims.

What is claimed is:

1. A burner for the combustion of fuel in a furnace, said burner comprising:
   (a) a primary air chamber;
   (b) a burner tube having an upstream end, a downstream end and a venturi intermediate said upstream and downstream ends, said venturi including a throat portion having substantially constant internal cross-sectional dimension such that the ratio of the length to maximum internal cross-sectional dimension of said throat portion is at least 3;
   (c) a burner tip mounted on the downstream end of said burner tube adjacent a first opening in the furnace, so that combustion of the fuel takes place downstream of said burner tip; and
   (d) a fuel orifice located adjacent the upstream end of said burner tube, for introducing fuel into said burner tube;
   wherein said burner tip comprises a plurality of main ports in an external surface thereof so that combustion of the fuel takes place downstream of said external surface of said burner tip, the number and dimensions of said main ports in said external surface being such that the total area of the main ports in said external surface is at least 1 square inch per MMBtu/hr burner capacity.

2. The burner according to claim 1, further comprising:
   (e) means including a plate for centering said fuel orifice in alignment with said burner tube, said centering plate being perforated to permit flow therethrough from said primary air chamber.

3. The burner according to claim 2, further comprising:
   (f) a fuel spud located adjacent the upstream end of said burner tube, for introducing fuel into said burner tube.

4. The burner according to claim 3, further comprising:
   (g) at least one passageway having a first end and a second end adjacent the upstream end of said burner tube;
   (h) means for drawing flue gas from said furnace, through said at least one passageway, in response to an inspirating effect of uncombusted fuel exiting said fuel spud, said uncombusted fuel flowing through said burner tube from its upstream end towards its downstream end; and
   (i) means for increasing the inspirating effect of uncombusted fuel exiting said fuel spud;
   whereby said means for increasing the inspirating effect of uncombusted fuel exiting said fuel spud is effective to increase the amount of flue gas drawn from the furnace as compared to a burner without said means for increasing the inspirating effect.

5. The burner according to claim 2, wherein said upstream end of said burner tube receives fuel and flue gas, air or mixtures thereof and wherein said burner further comprises:
   (f) at least one passageway having a first end at a second opening in the furnace for admitting flue gas and a second end adjacent the upstream end of said burner tube, said at least one passageway having a cross-sectional area and shape sufficient to permit a total FGR Ratio of greater than 10%; and
   (g) means for drawing flue gas from said furnace through said at least one passageway in response to an inspirating effect created by uncombusted fuel flowing through said burner tube from its upstream end towards its downstream end.

6. The burner according to claim 5, wherein said cross-sectional area of said passageway is substantially rectangular.

7. The burner according to claim 5, wherein said cross-sectional area ranges from about 5 square inches/MMBtu/hr to about 12 square inches/MMBtu/hr.

8. The burner according to claim 5, wherein said cross-sectional area comprises a major dimension and a minor dimension ranging from 30% to 100% of said major dimension.

9. The burner according to claim 1, wherein said burner is a pre-mix burner.

10. The burner according to claim 1, wherein said fuel comprises fuel gas.

11. The burner according to claim 1, wherein said burner further comprises at least one steam injection tube.

12. The burner according to claim 1, wherein the furnace is a steam cracking furnace.

13. The burner of claim 1, wherein the total area of said main ports in said external surface is at least 1.2 square inch per MMBtu/hr burner capacity.

14. The burner according to claim 1, further comprising at least one air port in fluid communication with a secondary air chamber of said furnace.

15. The burner according to claim 1, wherein the ratio of the length to maximum internal cross-sectional dimension of said throat portion is from about 4 to about 10.

16. The burner according to claim 1, wherein the ratio of the length to maximum internal cross-sectional dimension of said throat portion is from about 4.5 to about 8.

17. The burner according to claim 1, wherein the ratio of the length to maximum internal cross-sectional dimension of said throat portion is from about 6.5 to about 7.5.

18. The burner according to claim 1, wherein the ratio of the length to maximum internal cross-sectional dimension of said throat portion is from about 6.5 to about 7.0.

19. The burner according to claim 1, further comprising at least one passageway having a first end in fluid communication with a source flue gas and a second end adjacent the upstream end of the burner tube, flue gas being drawn from said furnace through said at least one passageway in response to the inspirating effect of the fuel flowing though said venturi, whereby the flue gas is mixed with air and said fuel prior to the combustion thereof.

20. The burner according to claim 19, wherein said first end of said at least one passageway is located at a second opening in the furnace, said at least one passageway being internal to the burner.

21. A burner for the combustion of fuel in a furnace, said burner comprising:
   (a) a burner tube having an upstream end, a downstream end and a venturi intermediate said upstream and downstream ends, said venturi including a throat portion having substantially constant internal cross-sectional dimensions such that the ratio of the length to maximum internal cross-sectional dimension of said throat portion is at least 3;
   (b) a burner tip adjacent a first opening in the furnace, so that combustion of the fuel takes place downstream of said burner tip;
   (c) a lighting chamber adjacent to the first opening in the furnace; and
   (d) a removable lighting chamber plug having a shape effective to substantially fill said lighting chamber when positioned within said lighting chamber.

22. The burner according to claim 21, wherein placement of said removable lighting chamber plug within said lighting chamber during burner operation is effective to reduce $NO_x$ emissions during combustion as compared to the burner without said removable lighting chamber plug so placed.

23. The burner according to claim 22, further comprising a sight and lighting port located in an interior wall of said burner and aligned with said lighting chamber.

24. A burner for the combustion of fuel in a furnace, said burner comprising:
   (a) a burner tube having a longitudinal axis and having a downstream end and an upstream end for receiving fuel and air, flue gas or mixtures thereof;
   (b) a fuel orifice located adjacent the upstream end of said burner tube, for introducing fuel into said burner tube;
   (c) means including a plate for centering said fuel orifice in alignment with said burner tube, said centering plate being perforated to permit flow therethrough from said primary air chamber
   (d) a burner tip mounted on the downstream end of said burner tube and adjacent a first opening in the furnace, said burner tip having a plurality of main ports substantially aligned with said longitudinal axis of the burner tube, and a plurality of peripherally arranged side ports; and
   (e) a peripheral tile which peripherally surrounds said burner tip, said peripheral tile providing at least one gap between an outer periphery of said burner tip and said peripheral tile, said at least one gap effective for providing a portion of the air for combustion
   wherein the quantity of fuel discharged during combustion from said peripherally arranged side ports does not exceed 15% of the total fuel combusted.

25. The burner of claim 24, wherein said fuel comprises fuel gas.

26. The burner according to claim 25, wherein the dimension of the burner-tip-to-peripheral-tile gap is such that the total air available to the fuel exiting the side ports is between about 5 to about 15 percentage points above a Fuel Rich Flammability Limit for the fuel gas being used.

27. The burner according to claim 26, wherein the fuel gas discharged during combustion from said peripherally arranged side ports is between about 5 to about 15 percent of the total fuel gas combusted.

28. The burner of claim 24, wherein said burner tip comprises a plurality of air flow notches positioned about an outer periphery thereof and said burner further comprises:
   (f) a burner tip seal in contact with at least a portion of said outer periphery of said burner tip and said peripheral tile
   wherein a plurality of air gaps is formed between an inner periphery of said burner tip seal and said air flow notches, said plurality of air gaps effective for providing a portion of the air for combustion.

29. The burner of claim 28, wherein said burner tip seal comprises a burner tip band, said burner tip band comprising steel, metal or metal composites capable of withstanding the harsh environment of an industrial burner.

30. The burner of claim 24, further comprising:
(f) at least one passageway having a first end at a second opening in the furnace and a second end adjacent the upstream end of said burner tube, said at least one passageway having an orifice, said first end being spaced an effective distance from said first opening for minimizing entrainment of a burner flame into said second opening;
(g) at least one bleed air duct having a first end and a second end, said first end in fluid communication with said orifice of said at least one passageway and said second end in fluid communication with a source of air which is cooler than the flue gas; and
(h) means for drawing flue gas from said furnace through said at least one passageway and air from said source of air from said at least one bleed air duct through said at least one passageway in response to an inspirating effect created by uncombusted fuel, flowing through said burner tube from its upstream end towards its downstream end, whereby the flue gas is mixed with air from said at least one air bleed duct prior to the zone of combustion of the fuel to thereby lower the temperature of the drawn flue gas.

31. The burner of claim 30, further comprising:
(i) a wall extending into the furnace between a first flame opening and said first end of said at least one passageway to substantially lengthen a flow path therebetween and thereby providing a substantial barrier to flow.

32. The burner of claim 31, wherein said wall peripherally surrounds said burner tip.

33. The burner of claim 32, wherein said wall operates to reduce the amount of oxygen flowing into the base of the flame.

34. The burner of claim 33, wherein said burner further comprises at least one steam injection tube.

* * * * *